(12) United States Patent
Clements et al.

(10) Patent No.: US 9,886,092 B2
(45) Date of Patent: Feb. 6, 2018

(54) HAPTICS FOR A HANDHELD INPUT APPARATUS

(71) Applicant: Microsoft Technology Licensing, LLC, Redmond, WA (US)

(72) Inventors: Bradley E. Clements, Fort Collins, CO (US); Perry Hargrave Pierce, Fort Collins, CO (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 268 days.

(21) Appl. No.: 14/887,167

(22) Filed: Oct. 19, 2015

(65) Prior Publication Data

US 2017/0108928 A1   Apr. 20, 2017

(51) Int. Cl.
  *G09G 5/00* (2006.01)
  *G06F 3/01* (2006.01)
  *G06F 3/0354* (2013.01)

(52) U.S. Cl.
  CPC .......... *G06F 3/016* (2013.01); *G06F 3/03545* (2013.01)

(58) Field of Classification Search
  CPC .. G06F 3/016; G06F 2203/014; G06F 3/0488; G06F 3/014; G06F 2203/015
  USPC .......................... 345/156, 173, 174, 175, 179
  See application file for complete search history.

(56) References Cited

U.S. PATENT DOCUMENTS

| | | |
|---|---|---|
| 3,915,015 A | 10/1975 | Crane et al. |
| 4,078,226 A | 3/1978 | EerNisse et al. |
| RE29,765 E | 9/1978 | Crane |
| 4,550,316 A | 10/1985 | Whetstone et al. |
| 4,896,543 A | 1/1990 | Gullman |
| 5,111,004 A | 5/1992 | Gullman |
| 5,295,307 A | 3/1994 | Archer |
| RE35,016 E | 8/1995 | Gullman et al. |
| 5,505,005 A | 4/1996 | McMurtry et al. |
| 5,672,929 A | 9/1997 | Gutsell et al. |
| 5,981,883 A | 11/1999 | Shriver |
| 6,396,232 B2 | 5/2002 | Haanpaa et al. |
| 6,439,791 B1 | 8/2002 | Takeuchi et al. |

(Continued)

FOREIGN PATENT DOCUMENTS

| | | |
|---|---|---|
| EP | 0836151 | 4/1998 |
| WO | 1990007097 A1 | 6/1990 |

(Continued)

OTHER PUBLICATIONS

Arasan,"Haptic Stylus with Inertial and Vibro-Tactile Feedback", In IEEE Conference on World Haptics, Apr. 14, 2013, pp. 425-430.

(Continued)

*Primary Examiner* — Duc Dinh

(57) ABSTRACT

Techniques for haptics for a handheld input apparatus are described. Generally, a handheld input apparatus can be used to provide input to various types of devices. According to various embodiments, a described handheld input apparatus includes a haptic motor for generating different haptic interactions between a tip of the apparatus and an input surface. According to various embodiments, a described handheld input apparatus includes strain sensor for determining different load forces on a tip of the apparatus. In at least some embodiments, a haptic mode for the haptic motor is determined based on load force detected by the strain sensor.

20 Claims, 23 Drawing Sheets

(56) References Cited

U.S. PATENT DOCUMENTS

| | | | |
|---|---|---|---|
| 6,678,966 B1* | 1/2004 | Koga | G01B 5/012 |
| | | | 33/558 |
| 6,718,647 B2 | 4/2004 | Trull et al. | |
| 6,981,768 B2 | 1/2006 | Saksa et al. | |
| 7,124,514 B2* | 10/2006 | McMurtry | G01B 7/012 |
| | | | 33/556 |
| 7,196,688 B2 | 3/2007 | Schena | |
| 7,265,750 B2 | 9/2007 | Rosenberg | |
| 7,603,789 B2 | 10/2009 | Hellier et al. | |
| 7,689,379 B2 | 3/2010 | Fuge et al. | |
| 8,913,042 B2* | 12/2014 | Mercea | G06F 3/033 |
| | | | 345/179 |
| 9,528,824 B2* | 12/2016 | Bos | G01B 21/04 |
| 2011/0004437 A1 | 1/2011 | Wooldridge et al. | |
| 2012/0127088 A1 | 5/2012 | Pance et al. | |
| 2015/0054783 A1 | 2/2015 | Curtis | |
| 2015/0138128 A1 | 5/2015 | Herrick et al. | |
| 2015/0212578 A1 | 7/2015 | Lor et al. | |
| 2017/0108950 A1 | 4/2017 | Clements et al. | |

FOREIGN PATENT DOCUMENTS

| | | |
|---|---|---|
| WO | 1992014987 A1 | 9/1992 |
| WO | WO-1994001834 | 1/1994 |
| WO | 2014102779 A2 | 7/2014 |
| WO | 2014127383 A2 | 8/2014 |

OTHER PUBLICATIONS

Reynaerts, et al., "Design of an Advanced Computer Writing Tool", In Proceedings of Sixth International Symposium on Micro Machine and Human Science, Oct. 4, 1995, pp. 229-234.

"International Search Report and Written Opinion", Application No. PCT/US2016/055381, dated Feb. 1, 2017, 16 pages.

"International Search Report and Written Opinion", Application No. PCT/US2016/056536, 01/032017, 15 pages.

"Notice of Allowance", U.S. Appl. No. 14/886,940, dated Aug. 1, 2017, 9 pages.

"Second Written Opinion", Application No. PCT/US2016/056536, dated Aug. 29, 2017, 9 pages.

* cited by examiner

HAPTICS FOR A HANDHELD INPUT APPARATUS

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a handheld input device (e.g., a pen, a stylus, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth. Current handheld input devices are limited in their ability to sense more subtle user manipulations and thus have difficulty in simulating an actual drawing experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for haptics for a handheld input apparatus are described. Generally, a handheld input apparatus can be used to provide input to various types of devices. According to various embodiments, a described handheld input apparatus includes a haptic motor for generating different haptic interactions between a tip of the apparatus and an input surface. According to various embodiments, a described handheld input apparatus includes strain sensor for determining different load forces on a tip of the apparatus. In at least some embodiments, a haptic mode for the haptic motor is determined based on load force detected by the strain sensor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
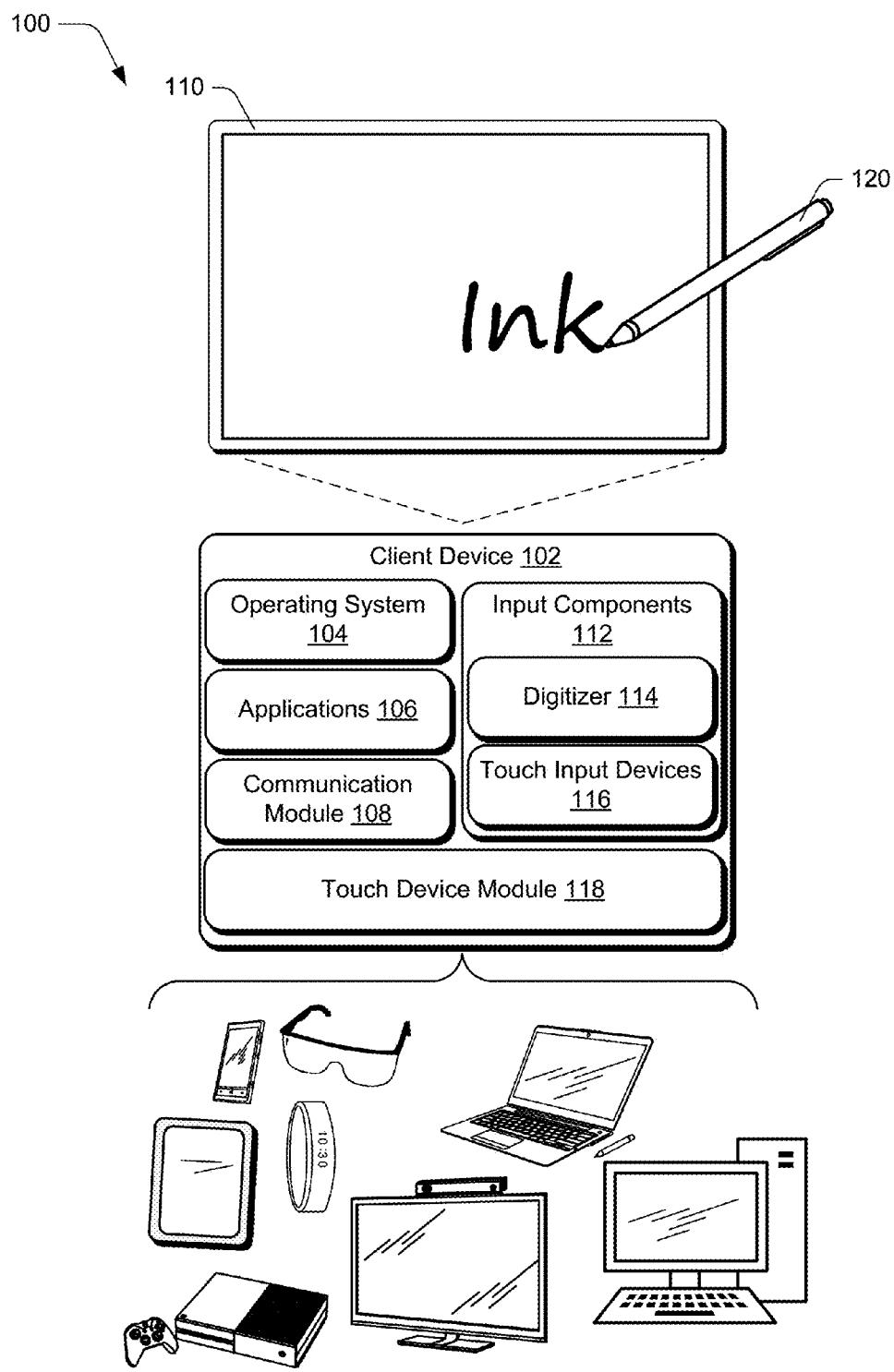
FIG. 1 is an illustration of an environment in an example implementation that is operable to employ techniques discussed herein in accordance with one or more embodiments.

Techniques for haptics for a handheld input apparatus are described. Generally, a handheld input apparatus can be used to provide input to various types of computing devices. For instance, a handheld input apparatus can be implemented as a pen that can be used to apply digital ink to an input surface such as a touchscreen. Generally, digital ink refers to freehand input to a contact-sensing functionality such as a touchscreen and/or digitizer screen, which is interpreted as digital ink.

According to various implementations, a handheld input apparatus is described that includes a haptic motor for controlling haptic interaction between a tip of the apparatus and an input surface. For instance, different haptic interactions can be generated that simulate different input scenarios, such as different pen types, different pencil types, different paint brushes and/or paint types, and so forth. Different haptic interactions, for example, create different frictional forces that affect movement of the tip of the handheld input apparatus across an input surface.

According to various implementations, a handheld input apparatus is described that includes a strain sensor for determining different load forces on a tip of the apparatus. For instance, when a user applies the tip to an input surface, measurements from the strain sensor are used to determine an amount of force applied by the user and a direction of force applied by the user. Based on the different determined force and directional information, input characteristics of the handheld input apparatus can be controlled. For instance, characteristics of digital ink can be determined based on force and direction information, such as line width, shading, texture, and so forth. Further, a haptic mode for the handheld input apparatus can be specified based on a determined load force on the tip. For instance, the load force detected by the strain sensor can indicate a direction of movement of the tip relative to an input surface, and the direction of movement can be used to control a haptic mode of a haptic motor of the handheld input apparatus.

According to various implementations, a handheld input apparatus includes components for determining an angular and/or rotational orientation of the apparatus relative to an input surface. For instance, when a user manipulates the handheld input apparatus to apply digital ink to an input surface, an angular and/or rotational orientation of the apparatus relative to the input surface is determined. Generally, the orientation of the handheld input apparatus can be used to determine different input characteristics, such as line width, shading, texture, and so forth. In at least some implementations, orientation information can be combined with force and directional information to provide diverse input scenarios.

In the following discussion, an example environment is first described that is operable to employ techniques described herein. Next, a section entitled "Example Pen, Strain Sensor, and Haptic Motor" describes some example attributes of a handheld input apparatus in accordance with one or more embodiments. Following this, a section entitled "Example Procedures" describes some example methods for a handheld input apparatus in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for haptics for a handheld input apparatus discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. Thus, the client device 102 may range from a system with significant processing power to a lightweight device with minimal processing power. One of a variety of different examples of a client device 102 is shown and described below in FIG. 23.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represent functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communicate over wired and/or wireless connections. For instance, the communication module 108 represents hardware and logic for communication via a variety of different wired and/or wireless technologies and protocols.

The client device 102 further includes a display device 110, input components 112 including a digitizer 114 and touch input devices 116, and a touch device module 118. The display device 110 generally represents functionality for visual output for the client device 102. Additionally, the display device 110 represents functionality for receiving various types of input, such as touch input, pen input, and so forth. The input components 112 generally represent different functionalities for receiving input to the client device 102. Examples of the input components 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input components 112 may be separate or integral with the displays 110, with integral examples including gesture-sensitive displays with integrated touch-sensitive or motion-sensitive sensors. The digitizer 114 represents functionality for converting various types of input to the display device 110 and the touch input devices 116 into digital data that can be used by the client device 102 in various ways, such as for generating digital ink.

According to various implementations, the touch device module 118 represents functionality for configuring various settings of the touch input devices 116 and/or for enabling interactions between the touch input devices 116 and other components of the client device 102.

The environment 100 further includes a pen 120, which is representative of an instance of the touch input devices 116 for providing input to the display device 110. Generally, the pen 120 is in a form factor of a traditional pen but includes functionality for interacting with the display device 110 and other functionality of the client device 102. In at least some implementations, the pen 120 is an active pen that includes electronic components for interacting with the client device 102. The pen 120, for instance, includes a battery that can provide power to internal components of the pen 120. In some configurations, the pen 120 may be referred to as a stylus.

Generally, the pen 120 is representative of an input device that can provide input that can be differentiated from other types of input by the client device 102. For instance, the digitizer 114 is configured to differentiate between input provided via the pen 120 and input provided by a different input mechanism such as a user's finger. As further described below, the pen 120 includes various internal components that enable techniques for haptics for a handheld input apparatus described herein. While various features are discussed herein with reference to the pen 120, it is to be appreciated that implementations discussed herein may be utilized with any suitable handheld input apparatus in accordance with the claimed embodiments.

Having described an example environment in which the techniques described herein may operate, consider now a discussion of some example implementation scenarios in accordance with one or more embodiments.

Example Pen, Strain Sensor, and Haptic Motor

Figure 2:
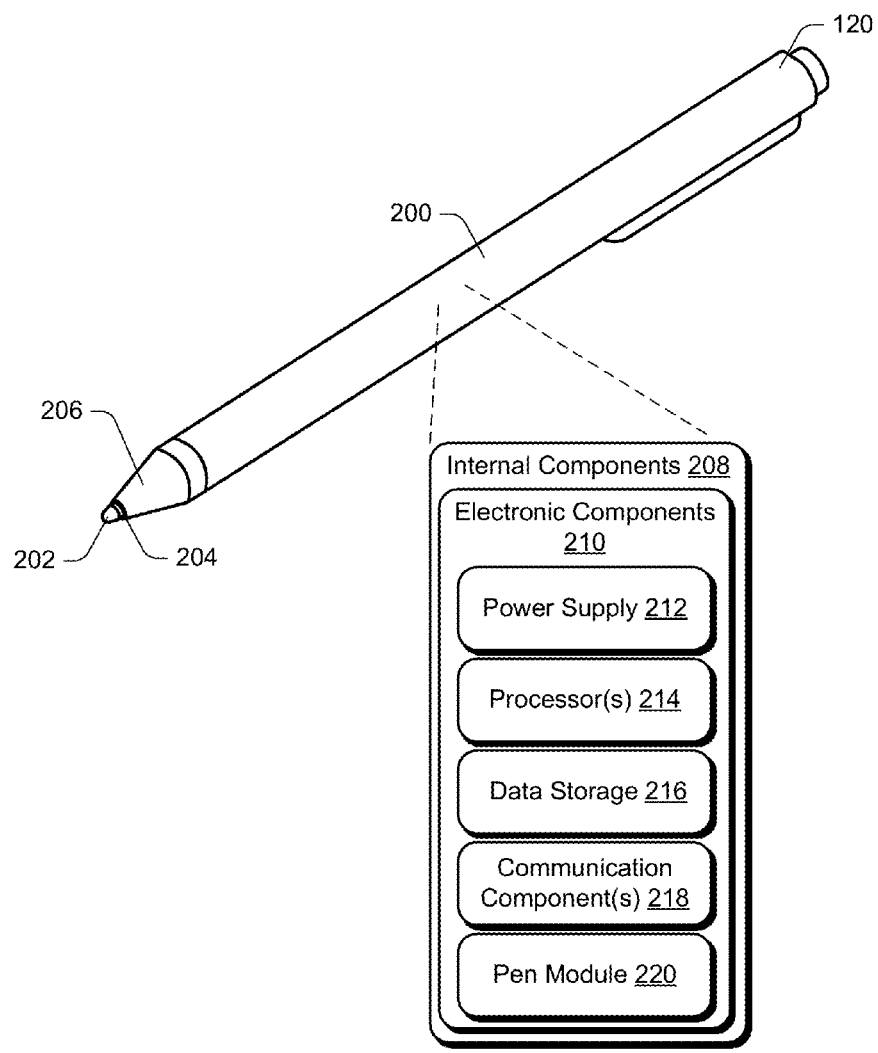
FIG. 2 depicts an example implementation of a pen in accordance with one or more embodiments.

FIG. 2 depicts an example implementation of the pen 120 in accordance with one or more implementations. The pen 120 includes a pen body 200, which represents a main body and/or chassis of the pen 120. For instance, various components of the pen 120 are attached to and/or contained within the pen body 200. The pen 120 further includes a tip 202 that extends through a tip aperture 204 in a nose 206 of the pen body 200. The tip 202 represents a portion of the pen 120 that can be leveraged to provide input and/or other types of interactions to an input surface, such as the display device 110 and/or others of the touch input devices 116. For instance, contact between the tip 202 and an input surface causes digital ink input to be applied to the input surface.

The pen 120 further includes internal components 208, which are representative of components that enable various functionalities of the pen 120. For instance, the internal components 208 include electronic components 210, which include a power supply 212, one or more processors 214, data storage 216, communication components 218, and a pen module 220. Generally, the power supply 212 represents a power source for various components of the pen 120. Examples of the power supply 212 include one or more batteries, an inductive coil, a wired power circuit configured to receive power from a wire, and so forth.

The processors 214 represent functionality for performing different data processing tasks for the pen 120, and the data storage 216 represents functionality for storing data for the pen 120. Examples of the processors 214 and the data storage 216 are discussed below with reference to the system 2300.

The communication components 218 are representative of functionality for enabling data communication between the pen 120 and other devices, such as the client device 102. In at least some implementations, the communication components 218 are configured to transmit and receive wireless signals using any suitable wireless protocol, such as Bluetooth, radio-frequency identifier (RFID), and so forth. For instance, the communication components 218 can exchange (send and receive) wireless signals with the client device 102, such as for configuring different operational settings of the pen 120 and/or the client device 102.

The pen module 220 is representative of functionality for performing different logic-based tasks for the pen 120, such as receiving strain measurements, calculating relative load forces based on strain, determining angular and/or rotational orientation of the pen 120, controlling a haptic mode of the pen 120, and so forth. As further detailed below, the internal components 208 generally include various electronic and structural components for enabling techniques for haptics for a handheld input apparatus described herein.

Figure 3:
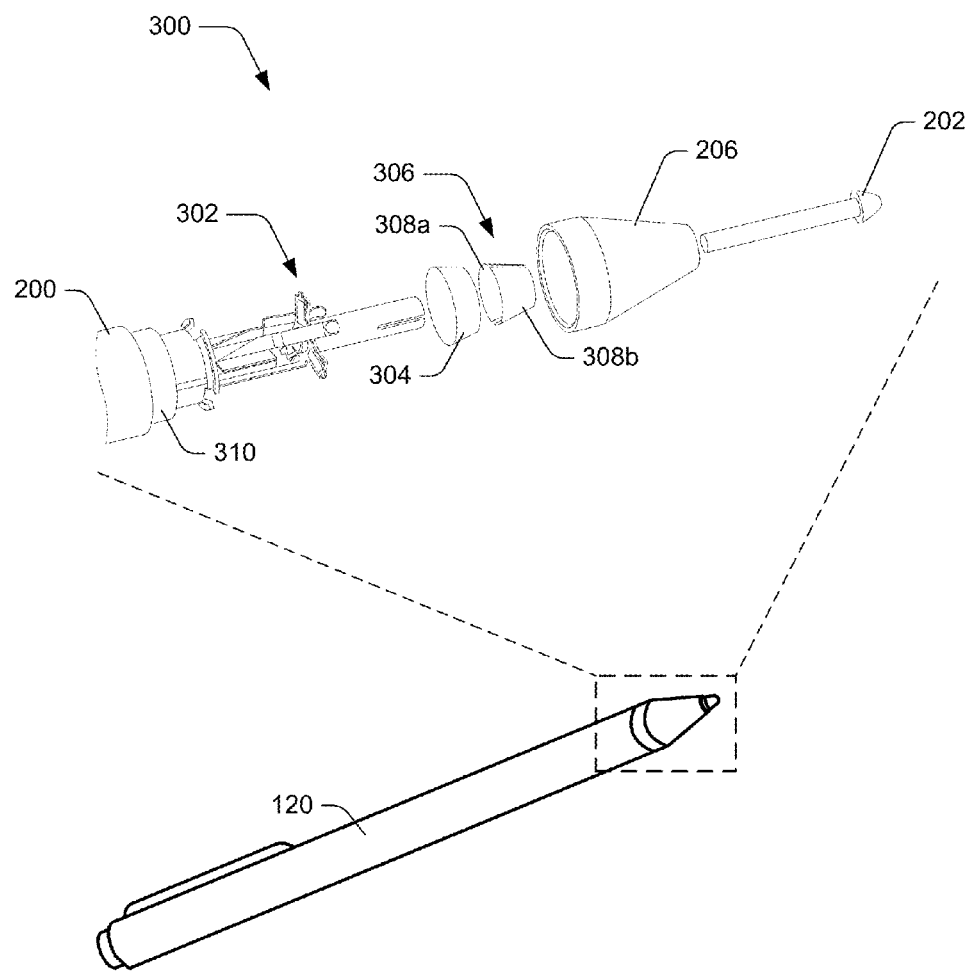
FIG. 3 depicts an example exploded view of a portion of a pen in accordance with one or more embodiments.

FIG. 3 depicts an example exploded view 300 of a portion of the pen 120 in accordance with one or more implementations. The exploded view 300 includes the tip 202, the nose 206, and a portion of the pen body 200. The exploded view 300 also includes some of the internal components 208, such as a strain sensor 302, a cone 304, and a roll cone set 306 including a half cone 308a and a half cone 308b. Generally, when the pen 120 is assembled, the cone 304 and the roll cone set 306 slide over a portion of the strain sensor 302 such that the cone 304, the roll cone set 306, and the strain sensor 302 are coaxial.

Further, when the pen 120 is assembled the nose 206 is fastened to a lip 310 on the pen body 200 via any suitable attachment means. For instance, an outer surface of the lip 310 and an inner surface of the nose 206 may be threaded such that the nose 206 can be screwed onto the lip 310. Alternatively or additionally, the nose 206 may be fastened onto the lip 310 via a suitable adhesive and/or joining technique. As further discussed below, the tip 202 is inserted into a portion of the strain sensor 302.

Figure 4:
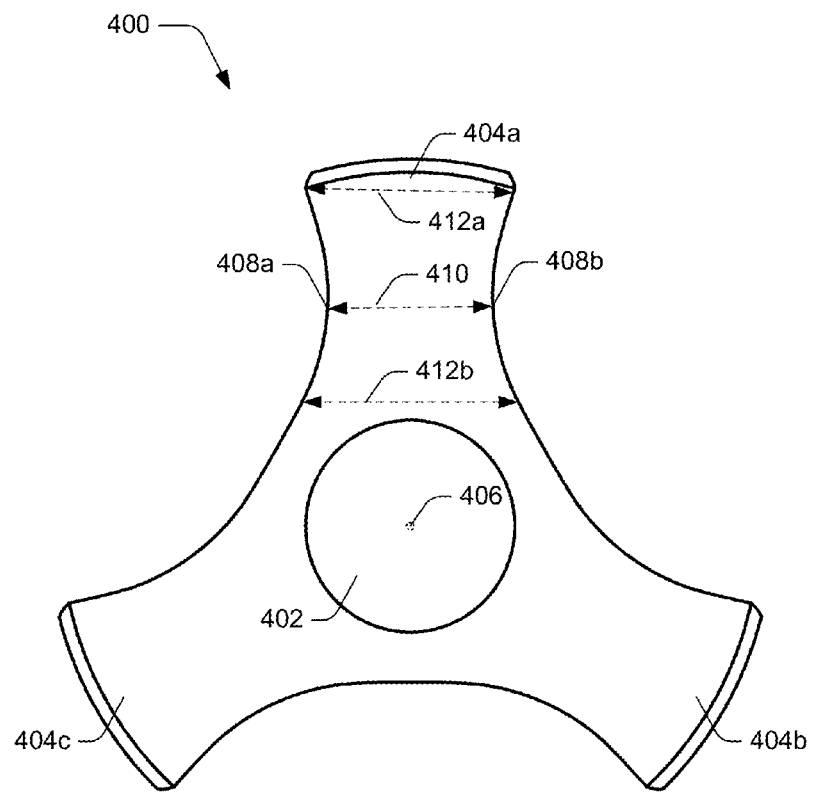
FIG. 4 depicts an example spoke plate in accordance with one or more embodiments.

FIG. 4 depicts an example spoke plate 400, which is a portion of the strain sensor 302 introduced above. The spoke plate 400 includes a central aperture 402 surrounded by a spoke 404a, a spoke 404b, and a spoke 404c. As illustrated, the spokes 404a-404c extend radially from a central axis 406 of the spoke plate 400 within the center of the aperture 402.

Notice that the spokes 404a-404c have a "waist" at and/or near the center of each spoke. For instance, with reference to the spoke 404a, a side 408a and a side 408b are crescent-shaped, e.g., parabolic and/or semi-parabolic in shape. A center width 410 of the spoke 404a, for example, is thinner than an upper width 412a and a lower width 412b. Generally, this tapered contour of the spoke plate 400 enables an increase in accuracy and sensitivity for strain force measurements in comparison to legacy designs. For instance, the tapered contour focuses strain force on a particular spoke within the center of the spoke (e.g., along the center width 410) to enable more accurate and sensitive strain force measurements to be captured.

Figure 5:
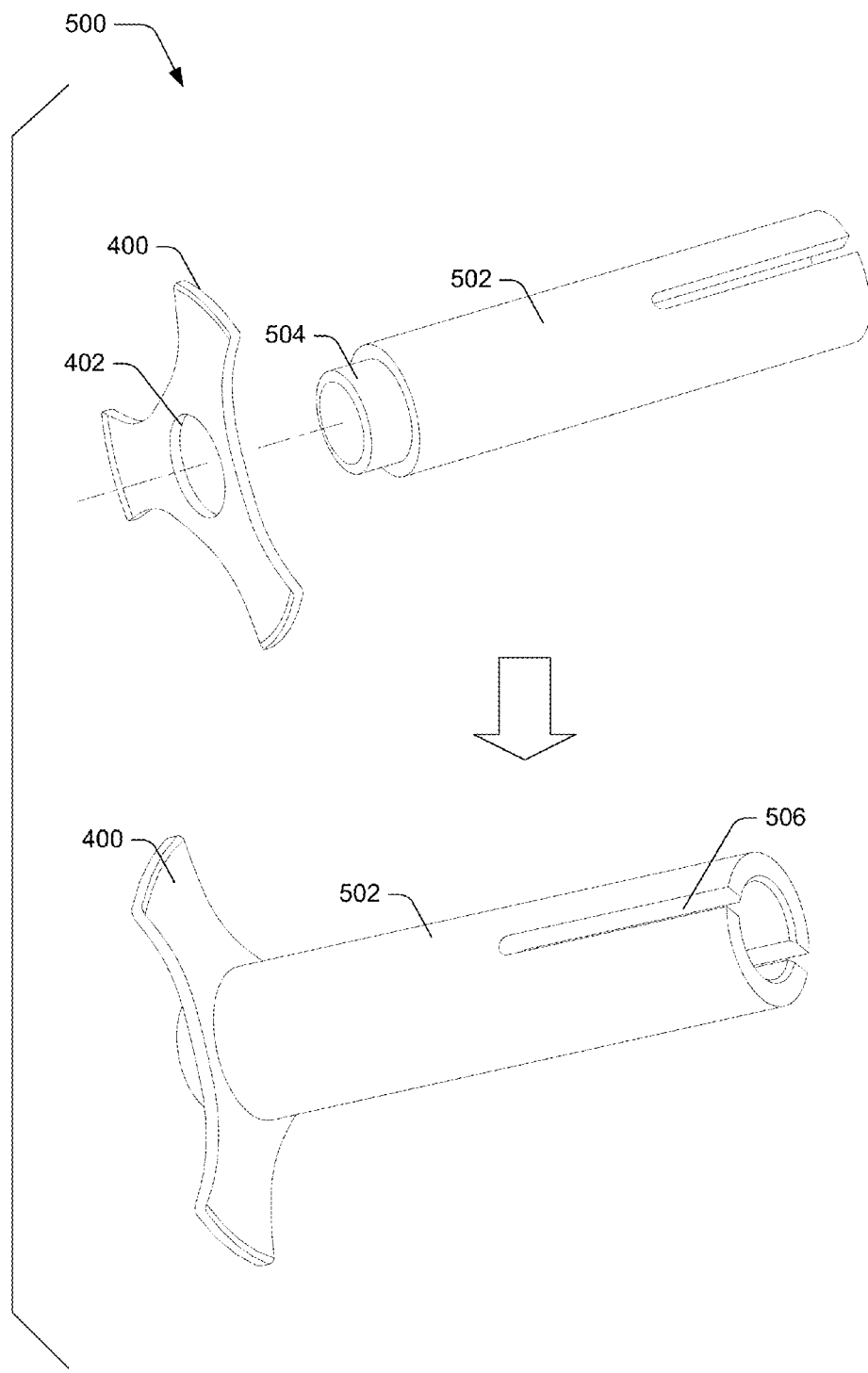
FIG. 5 depicts an example scenario for assembly of a portion of the strain sensor in accordance with one or more embodiments.

FIG. 5 depicts an example scenario 500 for assembly of a portion of the strain sensor 302 in accordance with one or more implementations. The upper portion of the scenario 500 illustrates the spoke plate 400 and a shaft 502. The shaft 502 has a lip 504 with an outer circumference that enables the lip 504 to be positioned within the aperture 402.

Proceeding to the lower portion of the scenario 500, the lip 504 is positioned within the aperture 402 to enable the spoke plate 400 to be attached to the shaft 502. The spoke plate 400 can be attached to the shaft 502 using any suitable attachment technique, such as an adhesive, welding, compression fitting, and so forth.

Notice that the shaft 502 is hollow and includes a slot 506 that runs longitudinally along a portion of the body of the shaft 502 from an end of the shaft 502 opposite the spoke plate 400. In at least some implementations, the shaft 502 is pinched around the slot 506 such that an inner circumference of the shaft 502 around the slot 506 is smaller than an inner circumference of the shaft 502 in the region between the end of the slot 506 and the spoke plate 400. In at least some implementations, this enables the tip 202 to be positioned within the shaft 502 such that the portion of the shaft 502 around the slot 506 applies pressure (e.g., "pinches") the tip 202 to hold the tip 202 within the shaft 502.

Figure 6:
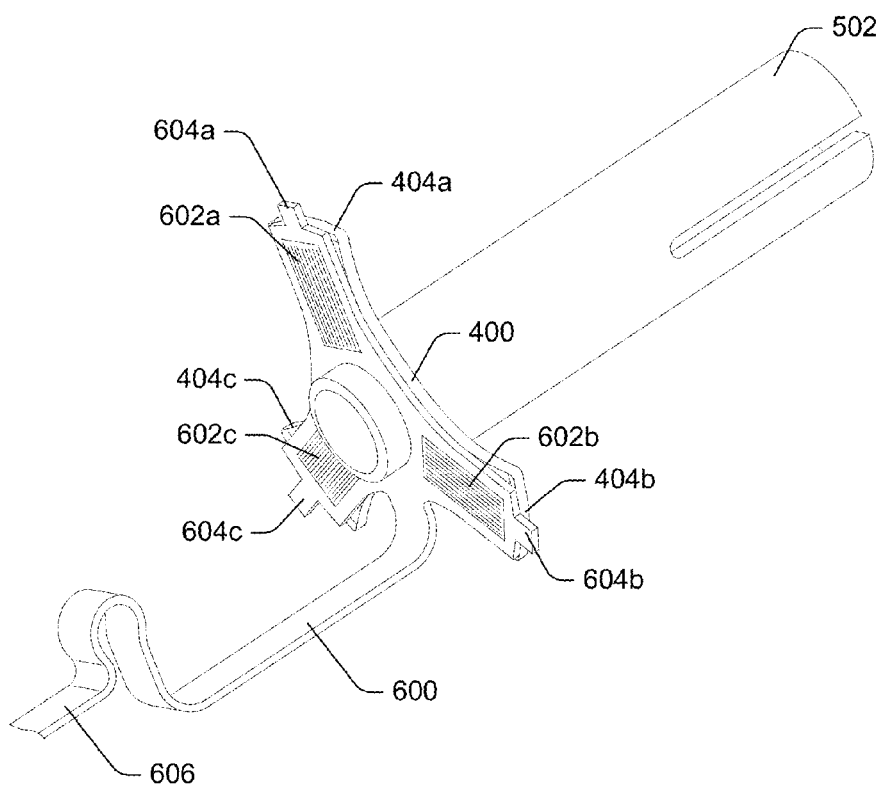
FIG. 6 depicts a flexible circuit attached to a spoke plate in accordance with one or more embodiments.

FIG. 6 depicts a flexible circuit 600 attached to the spoke plate 400. Generally, the flexible circuit 600 includes various electronic elements for the pen 120, such as electronic elements that enable functionality of the strain sensor 302. In at least some implementations, the flexible circuit 600 represents a flexible printed circuit (FPC).

The flexible circuit 600 includes a sensor element 602a, a sensor element 602b, and a sensor element 602c each bonded to a respective spoke 404a-404c. Generally, the sensor elements 602a-602c each represent different elements for characterizing changes in surface characteristics of the respective spokes 404a-404c. For instance, when a user presses the tip 202 of the pen 120 against an input surface (e.g., the display 110), force is transferred from the tip 202 along the shaft 502 to the spoke plate 400, which causes a change in a surface profile of one or more of the spokes 404a-404c. One or more of the spokes 404a-404c, for example, will bend and/or twist in various ways in response to pressure applied to the tip 202 and transferred to the spoke plate 400. This change in surface profile of a particular spoke 404a-404c causes a corresponding deformation of a respective sensor element 602a-602c, which in turn causes a corresponding change in an electrical property of the respective sensor element 602a-602c. For instance, deformation of a sensor element 602a-602c causes a change in electrical resistance of the sensor element. This change in electrical resistance can be interpreted by electronic components of the pen 120 and/or the client device 102 as strain force being applied to the tip 202.

The sensor elements 602a-602c may be implemented in various ways, such as a metallic grid applied to a flexible non-conductive substrate of the flexible circuit 600, a flexible silicon strain element, a nanoparticle-based strain sensor, and so forth. Further, the sensor elements 602a-602c may be attached to the respective spokes 404a-404c using any suitable means of attachment, such as an adhesive, thermal bonding, lamination, and so forth.

While the sensor elements 602a-602c are depicted in this example as being separate elements that are attached to the spokes 404a-404c, it is to be appreciated that in at least some implementations, the sensor elements 602a-602c may be integrated into the spokes 404a-404c. For instance, the spokes 404a-404c can be manufactured with sensor elements 602a-602c integrated into the body of the spokes 404a-404c, such as embedded in the material used to form the spoke plate 400.

The flexible circuit 600 further includes tabs 604a-604c at the tip of each sensor element 602a-602c and an electrical connection 606. When the strain sensor 302 is assembled into the pen body 200 of the pen 120, for instance, each of the tabs 604a-604c is bent over a top edge of a respective spoke 404a-404c. In at least some implementations, the tabs 604a-604c serve to physically and/or electrically insulate the respective spokes 404a-404c, and thus the strain sensor 302, from the body 200 of the pen 120.

The electrical connection 606 represents conductive pathways between the sensor elements 602a-602c to other electrical components of the pen 120. For instance, electrical current from the power supply 212 of the pen 120 is fed to the sensor elements 602a-602c with a return path back to different logic and processing components of the pen 120 through the electrical connection 606. Further, each sensor element 602a-602c includes a separate power lead and return path within the flexible circuit 600. According to various implementations, this enables changes in an electrical property in each of the sensor elements 602a-602c to be separately detected and utilized to characterize strain force on the individual spokes 404a-404c, and thus enables both an amount of force and a direction of force applied to the tip 202 against an adjacent input surface to be detected and characterized.

Although not expressly illustrated here, the flexible circuit 600 also includes a tip feed connection for providing electrical current to the tip 202. For instance, the surface of the flexible circuit 600 opposite one or more of the sensor elements 602a-602c includes a conductive portion that is bonded to the spoke plate 400, such as via a conductive adhesive. Accordingly, the conductive portion is used to feed power to the spoke plate 400, which conducts the power to the shaft 502 and the tip 202 situated within the shaft 502. Accordingly, the tip 202 is powered and can be detected by an input surface such as the display 110.

Figure 7:
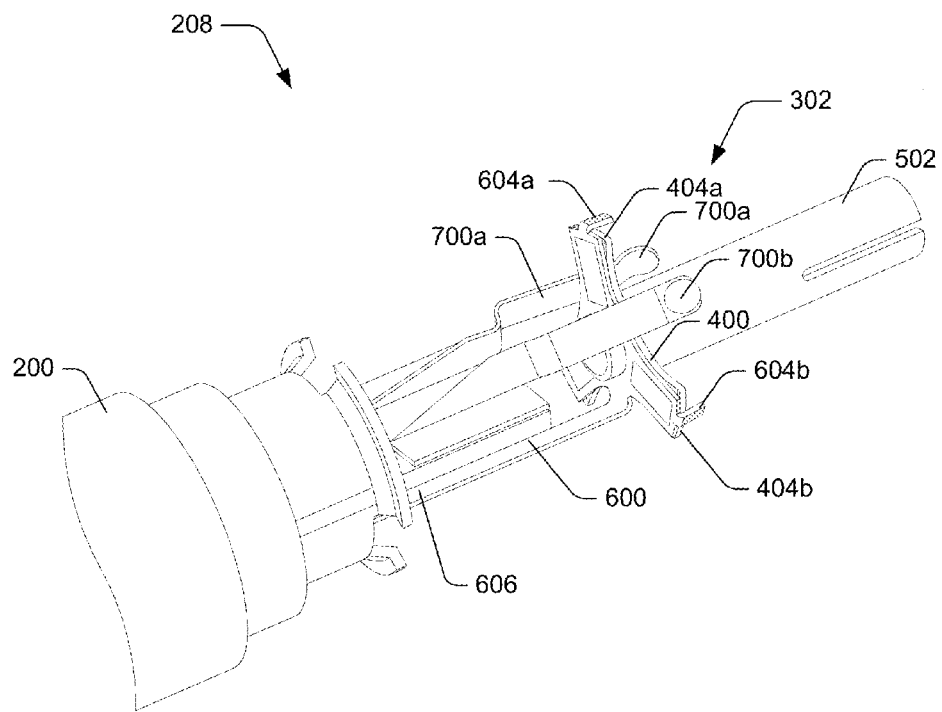
FIG. 7 depicts an exploded view of some internal components of a pen in accordance with one or more embodiments.

FIG. 7 depicts an exploded view of some of the internal components 208 of the pen 120. Depicted here is the strain sensor 302 including the shaft 502 and the flexible circuit 600 attached to the spoke plate 400, as discussed in more detail above. Further depicted is the electrical connection 606 of the flexible circuit 600, which extends into the interior of the pen body 200 and attaches to other electronic components 210 (discussed above) of the pen 120. Notice that the tabs 604a, 604b are bent over the top edges of their respective spokes 404a, 404b. Although not visible in this view, the tab 404c is similarly bent over the top edge of the spoke 404c. As discussed above, the tabs 604a-604c may serve to electrically and/or mechanically insulate the spoke plate 400 from the pen body 200 of the pen 120. Alternatively, the tabs 604a-604c may serve to mechanically insulate the spoke plate 400 from the pen body 200 and electrically connect the spoke plate 400 to the pen body 200, such as for a ground connection for the strain sensor 302. In yet another implementation, one or more of the tabs 604a-604c may bend over the respective spokes 404a-404c to electrically connect the flexible circuit 600 to a component on an opposite side of the spoke plate 400 from the flexible circuit 600.

Also shown in FIG. 7 are a cone contact 700a and a cone contact 700b. According to various implementations, the cone contacts 700a, 700b represent electrically conductive contacts that provide an electrical connection between the cone set 306 (introduced above) and other internal components of the pen 120. For instance, the cone contacts 700a, 700b are attached to the electronic components 210, such as via a soldered connection. Further, the cone contacts 700a, 700b extend forward from the electronic components 210 toward the nose 206. For instance, the cone contacts 700a, 700b extend through gaps between the spokes 404a-404c in the spoke plate 400. As further detailed below, the cone contacts 700a, 700b each extend forward past the spoke plate 400 to contact a respective half cone 308a, 308b of the cone set 306. In at least some implementations, proximity and orientation of the half cones 308a, 308b relative to an adjacent input surface (e.g., the display 110) can be detected via electrical interaction between the input surface and the half cones 308a, 308b.

Figure 8:
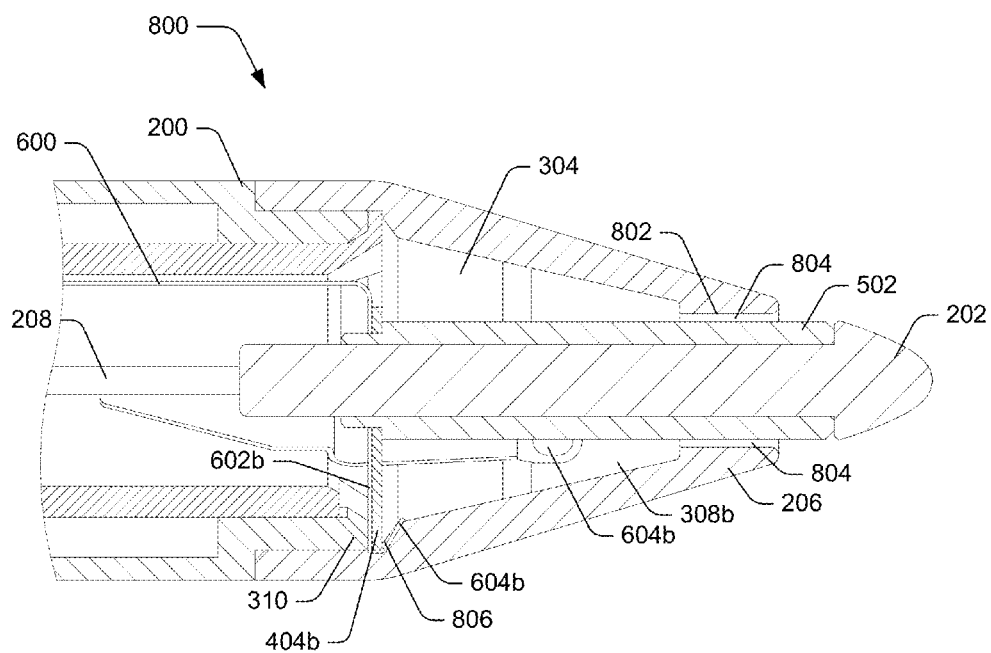
FIG. 8 depicts a side cross section of a front portion of a pen in accordance with one or more embodiments.

FIG. 8 depicts a side cross section 800 of a front portion of the pen 120 in accordance with one or more implementations. The cross section 800 illustrates a cross section of the pen body 200, the nose 206, and the tip 202. Also illustrated is a cross section of certain portions of the strain sensor 302, including the shaft 502, a portion of the spoke plate 400 including the spoke 404b, and the flexible circuit 600. Notice here that the tab 604b is bent over the top edge of the spoke 404b and reaches over to contact the cone 304. In this particular implementation, the tab 604b includes a conductive portion that serves as an electrical pathway between the cone 304 and one or more of the electronic components 208. The tab 604b, for instance, includes an electrical feed to the cone 304 and/or a return path from the cone 304 to one or more of the electronic components 208.

Although not illustrated in this view, the tabs 604a, 604c may also be bent over their respective spokes 404a, 404c to make contact with the cone 304 and provide a conductive pathway between the cone 304 and other components of the pen 120. For instance, one of the tabs 604a-604c may represent an electrical feed path to the cone 304, while another of the tabs 604a-604c may represent an electrical return path from the cone 304 to one or more of the electronic components 208.

The cross section 800 also shows the cone contact 700b in physical contact with the half cone 308b and attached to one or more of the electronic components 208. As discussed above, the cone contact 700b provides a conductive pathway between the half cone 308b and one or more of the electronic components 208. Although not illustrated in this view, the cone contact 700a similarly provides a conductive pathway between the half cone 308a and one or more of the electronic components 208. As further discussed below, electrical interaction between the cone 304, the half cones 308a, 308b, and an adjacent input surface enable an orientation of the pen 120 to be determined relative to the input surface.

The cross section 800 further illustrates that the shaft 502 protrudes through an aperture 802 in the nose 206 and that there is a small gap 804 between the peripheral surface of the shaft 502 and the surface of the aperture 802. According to various implementations, the gap 804 enables the shaft 502 to flex relative to the nose 206 when a user presses the tip 202 against an input surface. This flexing of the shaft 502 promotes the transmission of force from the tip 202 to the spokes 404a-404c and thus to the sensor elements 602a-602c such that strain force sensed by the sensor elements 602a-602c can be used to characterize force applied to the tip 202.

Also shown in FIG. 8 is that the spoke 404b is pressed between an inner edge 806 of the nose 206 and the lip 310. Although not illustrated here, the other spokes 404a, 404c may be similarly pressed (e.g., sandwiched) between the inner edge 806 and the lip 310. Generally, this enables attachment of the strain sensor 302 within the pen 120 and prevents the spokes 404a-404c from moving (e.g., rotating) within the pen 120 when force is applied to the tip 202. The cross section 800 further shows the flexible circuit with the sensor element 602b attached to the spoke 404b, as detailed above.

Figure 9:
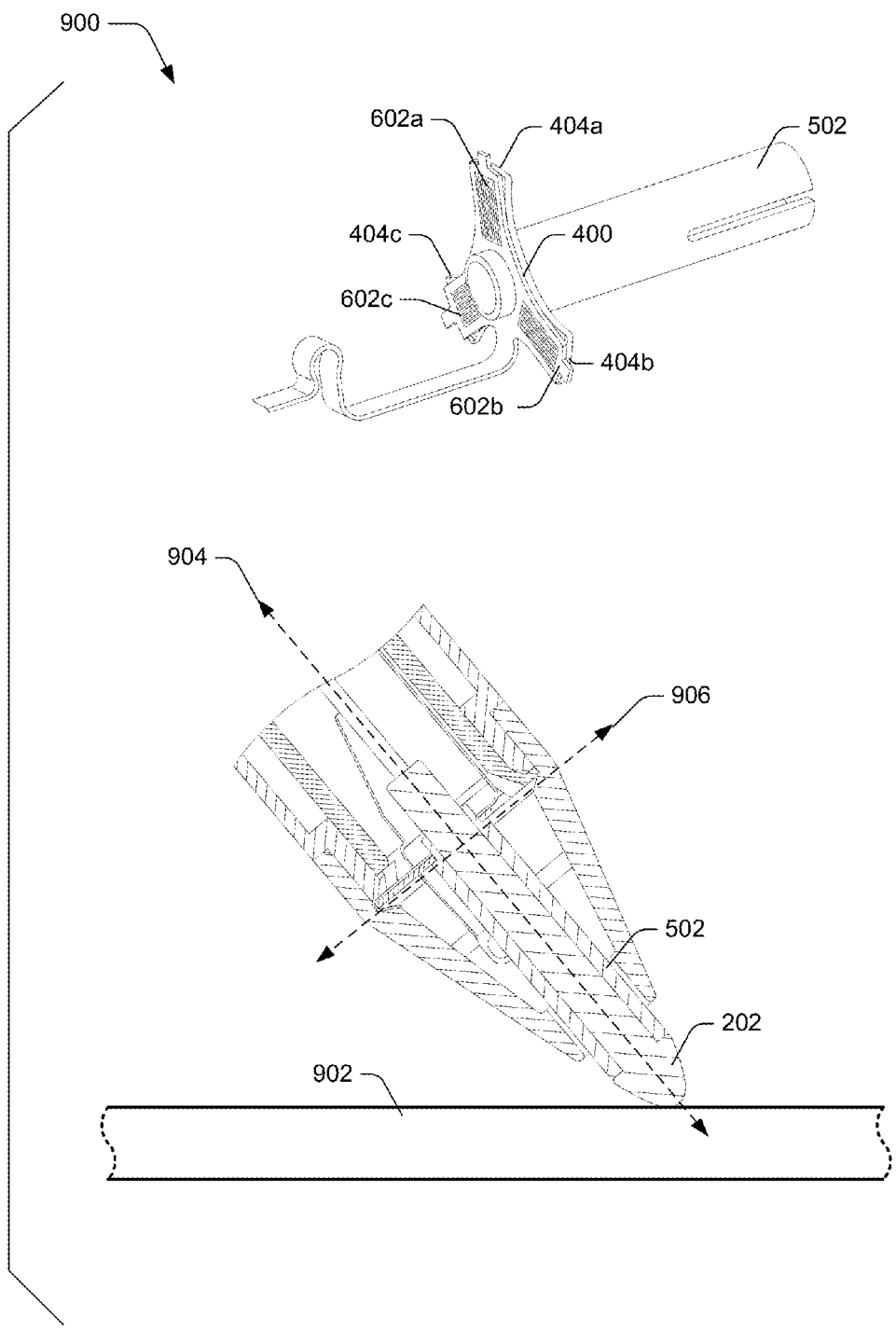
FIG. 9 depicts an example implementation scenario for determining force applied to a tip of a pen in accordance with one or more embodiments.

FIG. 9 depicts an example implementation scenario 900 for determining force applied to the tip 202 of the pen 120 against an input surface 902 in accordance with one or more implementations. When a user presses the tip 202 against the input surface 902, axial load on the tip 202 causes the shaft 502 to apply pressure to the spoke plate 400 along a longitudinal axis 904 of the pen 120. This pressure along the longitudinal axis 904 causes each of spokes 404a-404c to flex. Accordingly, axial load on the tip 202 can be characterized by adding strain measurements for each of the sensor elements 602a-602c to obtain a total axial load on the tip 202.

Further, radial load on the tip 202 causes the shaft to flex relative to a lateral axis 906 of the pen 120. This flexing along the lateral axis 906 causes individual spokes 404a-404c to flex, such as to bend and/or twist. Thus, radial load on the tip 202 can be characterized by considering strain measurements for individual sensor elements 602a-602c. Radial load, for instance, can be obtained by determining a difference between strain measurements at the different sensor elements 602a-602c.

According to various implementations, force applied to the tip 202 can be characterized as a combination of the axial load and the radial load. For instance, the axial load indicates how much force is being applied along the longitudinal axis 904 into the plane of the input surface 902, and the radial load indicates a direction of force being applied to the tip 202 along (in the direction of) the plane of the input surface 902.

Figure 10:
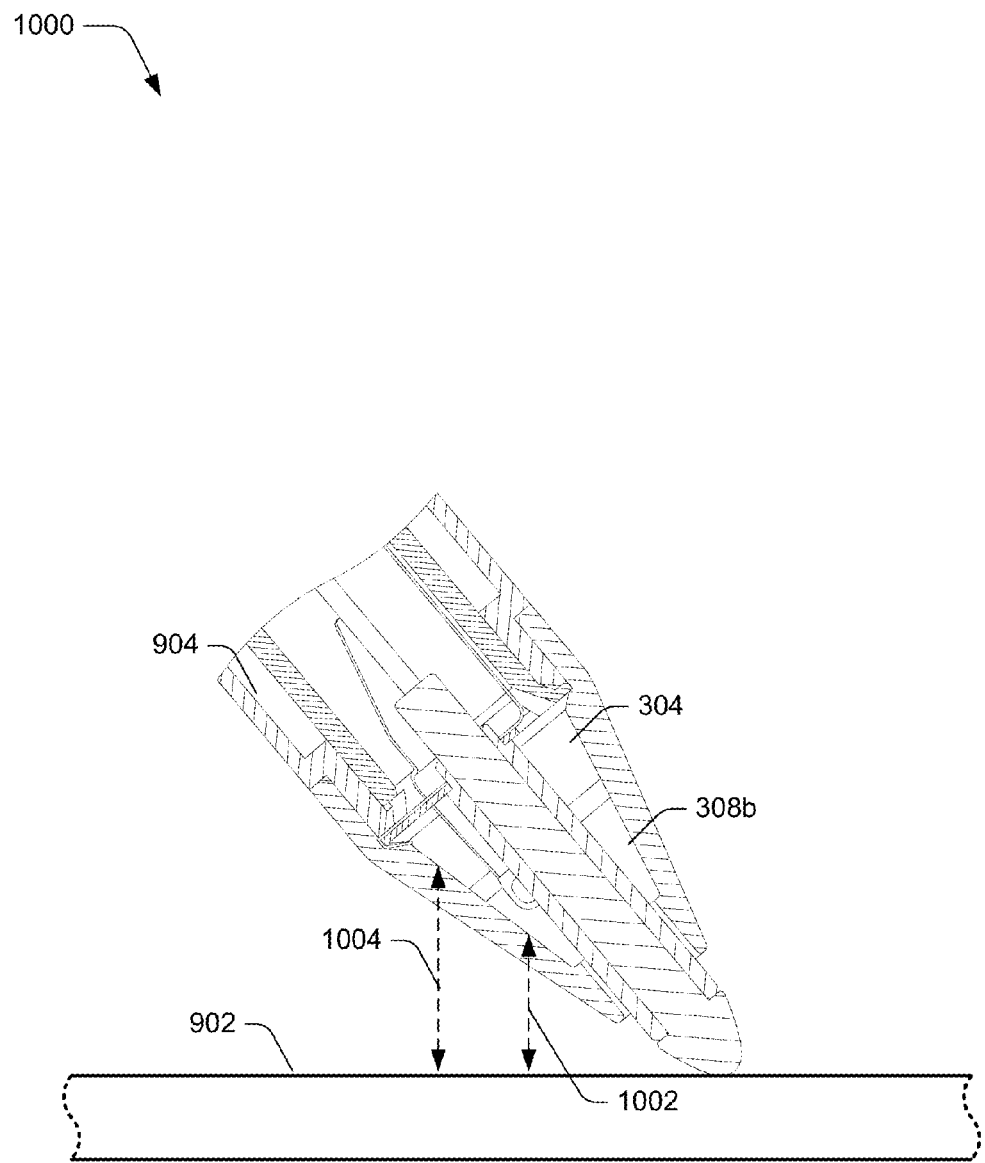
FIG. 10 depicts an example implementation scenario for determining an angular orientation of a pen relative to an input surface in accordance with one or more embodiments

FIG. 10 depicts an example implementation scenario 1000 for determining an angular orientation of the pen 120 relative to the input surface 902 in accordance with one or more implementations. Consider for purposes of the scenario 1000 that each of the half cone 308a (not depicted here), the half cone 308b, and the cone 304 has a different electrical property that can be used to differentiate the individual cones from one another. For instance, a different voltage is applied to each of the half cone 308a, the half cone 308b, and the cone 304. Alternatively, each of the half cone 308a, the half cone 308b, and the cone 304 is modulated with a different frequency.

Continuing with the scenario 1000, a distance 1002 of the half cone 308b from the input surface 902 can be determined by determining a strength of an electrical property of the half cone 308b (e.g., voltage and/or frequency modulation) detected at the input surface 902. Further, a distance 1004 of the cone 304 from the input surface 902 can be determined by determining a strength of an electrical property of the cone 304 (e.g., voltage and/or frequency modulation) detected at the input surface 1002. As mentioned above, the cone 304 and the half cone 308b have differing electrical properties (e.g., voltages and/or frequencies), thus enabling the distances of the cone 304 and the half cone 308b from the input surface 902 to be differentiated from each other.

Accordingly, an approximate angle of the pen 120 relative to the input surface 902 can be determined based on the difference between the distance 1004 and the distance 1002. For instance, a large difference between the distance 1004 and the distance 1002 indicates that the pen 120 is at a steep angle relative to the input surface 902, e.g., is closer to a 90° angle relative to the plane of the input surface 902. However, a small difference between the distance 1004 and the distance 1002 indicates that the pen 120 is at a shallow angle relative to the input surface 902, e.g., is closer to being parallel to the plane of the input surface 1002.

In at least some implementations, the different distances can be determined by a functionality associated with the input surface 902, such as the touch device module 118 of the client device 102. Alternatively or additionally, the different distances can be determined by logic and processing functionality that resides on the pen 120. As yet another example implementation, the different distances can be determined by interaction between the touch device module 118 and logic and processing functionality of the pen 120.

According to various implementations, the angle of the pen 120 relative to the input surface 902 can be used to determine an input property of input received from the pen 120. For instance, a steep angle of the pen 120, and thus the tip 202, can be used to draw a thin line on the input surface 902. However, a shallower angle of the pen 120 can be used to draw a thicker line on the input surface. Thus, the ability to detect an angle of the pen 120 relative to the input surface 902 enables a user to change the way the pen 120 applies input to the input surface 902 by varying the angle of the pen 120 relative to the input surface 902.

Figure 11:
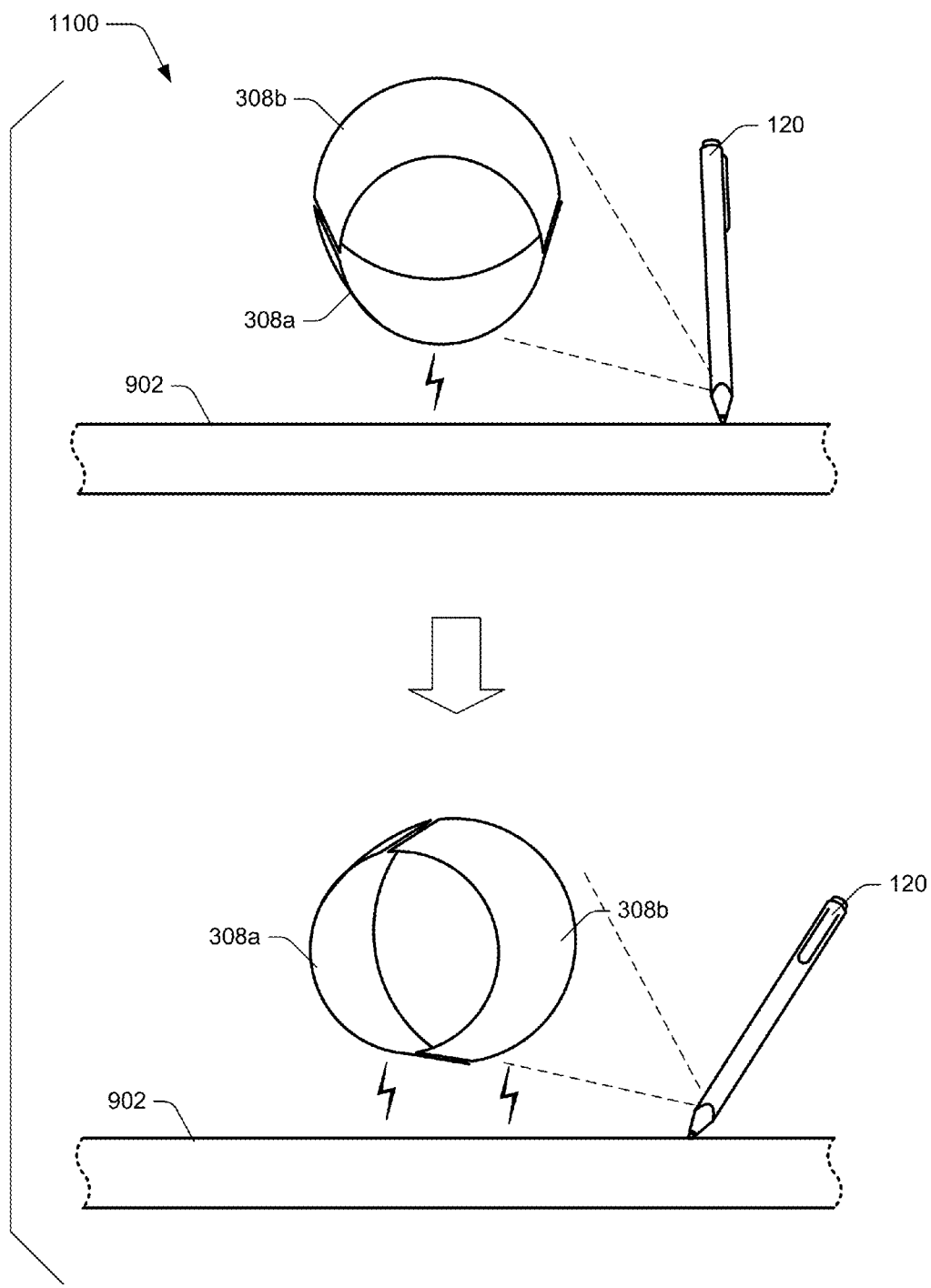
FIG. 11 depicts an example implementation scenario for determining a rotational orientation of a pen relative to an input surface in accordance with one or more embodiments.

FIG. 11 depicts an example implementation scenario 1100 for determining a rotational orientation of the pen 120 relative to the input surface 902 in accordance with one or more implementations. In the upper portion of the scenario 1100, the half cones 308a, 308b are depicted separately from other portions of the pen 120. As discussed above, the half cone 308a has a different electrical property than the half cone 308b, such as a different applied voltage and/or a different frequency modulation. Accordingly, a relative rotational orientation of the pen 120 to the input surface 902 can be determined based on which of the half cones 308a, 308b is detected in proximity to the input surface 902.

Generally, detecting proximity of the half cones 308a, 308b to the input surface 902 can be performed in various ways, such as by the touch device module 118, by the pen 120, and/or by interaction between the touch device module 118 and the pen 120.

In the upper portion of the scenario 1100, the half cone 308a is detected in proximity to the input surface 902. For instance, a particular electrical property of the half cone 308a is detected in proximity to the input surface 902.

Proceeding to the lower portion of the scenario 1100, the pen 120 is rotated such that both half cone 308a and the half cone 308b are detected in proximity to the input surface 902. The different electrical properties of the half cones 308a, 308b, for instance, are detected in proximity to the input surface 902. Thus, it is determined that the rotational orientation of the pen 120 has changed.

In at least some implementations, different rotation orientations of the pen 120 can be associated with different input modes. For instance, in the upper portion of the scenario 1100 the rotational orientation of the pen 120 may be such that input from the tip 202 to the input surface 902 produces a thin line of ink. However, in the lower portion of the scenario 1100 the rotational orientation of the pen 120 may be such that input from the tip 202 to the input surface 902 produces a thick line of ink. As some further examples, changing rational orientation of the pen 120 can cause a change in other input characteristics, such as a change in input color, a change in input texture, a change in font size, and so forth. Thus, different input modes and characteristics can be associated with different rotational orientations of the pen 120.

Figure 12:
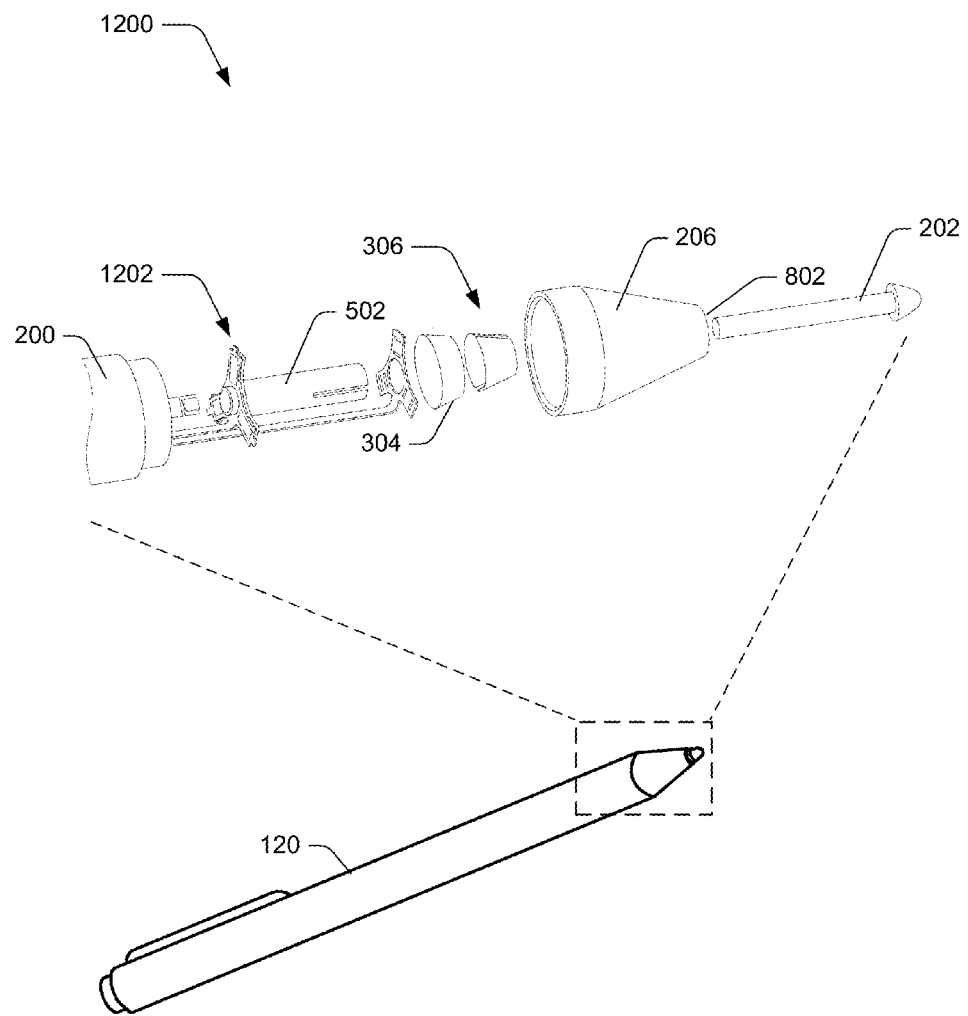
FIG. 12 depicts an example exploded view of a portion of a pen in accordance with one or more embodiments.

FIG. 12 depicts an example exploded view 1200 of a portion of the pen 120 in accordance with one or more implementations. Generally, the pen 120 depicted in FIG. 12 and the following drawings represents an extension and/or variation on the pen 120 detailed above. For instance, in at least some implementations, various attributes of the pen 120 discussed above apply as well to the version of the pen 120 presented in the following discussion.

The exploded view 1200 includes the tip 202, the nose 206, and a portion of the pen body 200. The exploded view 300 also includes some of the internal components 208, such as the cone 304, and the roll cone set 306, and a haptic motor 1202. In at least some implementations, the haptic motor 1202 may be implemented in conjunction with the strain sensor 302 detailed above. Alternatively, the haptic motor 1202 may be implemented independently of the strain sensor 302.

As further detailed below, the haptic motor 1202 can be activated to cause vibration of the tip 202 in various ways. For instance, vibration of the haptic motor 1202 causes vibration of the shaft 502, which in turn causes a vibration of the tip 202. Vibration of the tip 202 can be controlled using different haptic modes of the haptic motor 1202 to enable different haptic interactions between the tip 202 and an input surface, such as the display device 110.

As discussed above, in at least some implementations a gap exists between the shaft 502 and an inner surface of the aperture 802 in the nose 206 through which the shaft at least partially protrudes. Accordingly, the haptic motor 1202 can be controlled to vibrate the shaft 502 and the tip 202 while minimizing vibration of the pen body 200. For instance, the shaft 502 can vibrate within the gap in the aperture 802 without contacting the nose 206, thus preventing vibration from being transferred to the nose 206 and the pen body 200.

Figure 13:
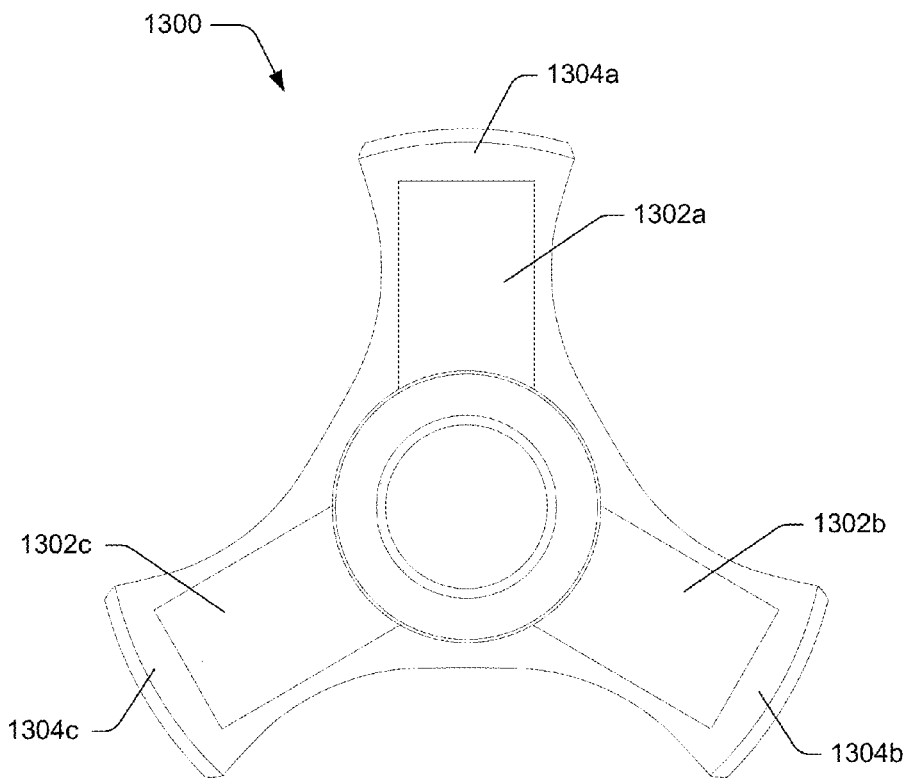
FIG. 13 depicts an example haptic spoke plate in accordance with one or more embodiments.

FIG. 13 depicts an example haptic spoke plate 1300 in accordance with one or more implementations. Generally, the haptic spoke plate 1300 represents a portion of the haptic motor 1202 introduced above. In at least some implementations, the haptic spoke plate 1300 represents a variation and/or extension of the spoke plate 400 detailed above. Accordingly, in at least some implementations, attributes of the spoke plate 400 discussed above also apply to the haptic spoke plate 1300.

The haptic spoke plate 1300 includes a haptic element 1302a on a spoke 1304a, a haptic element 1302b on a spoke 1304b, and a haptic element 1302c on a spoke 1304c. Generally, the haptic elements 1302a-1302c represent portions of the haptic spoke plate 1300 to which electrical current can be applied to cause movement (e.g., vibration) of the haptic spoke plate 1300. The haptic elements 1302a-1302c can be implemented in various ways, such as ceramic layers deposited on the respective spokes 1304a-1304c, piezo-electric circuits and/or materials embedded within the respective spokes 1304a-1304c, and so forth. For instance, the haptic elements 1302a-1302c can be implemented as piezoelectric elements bonded to a surface of each of the respective spokes 1304a-1304c.

Figure 14:
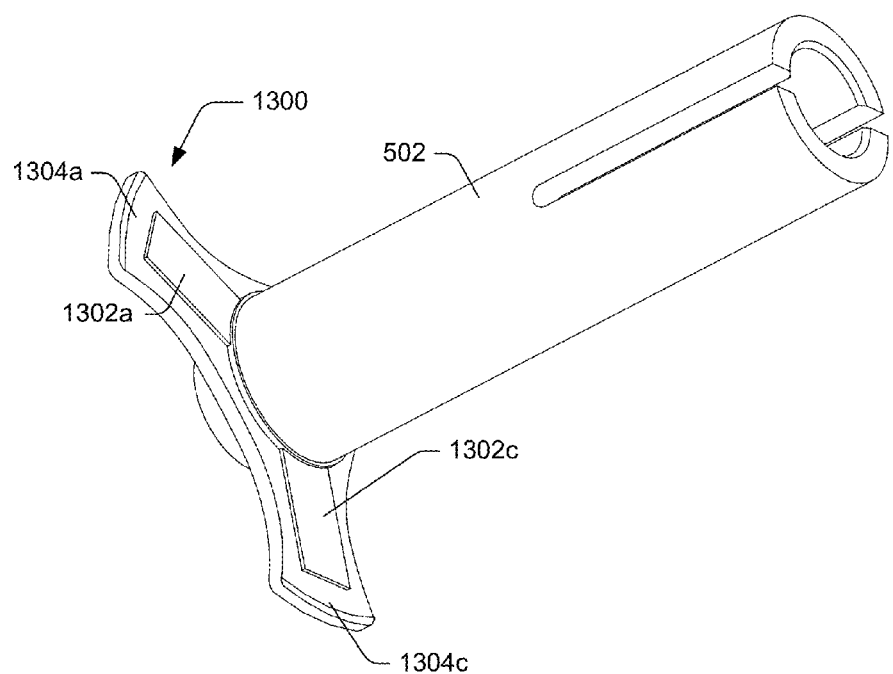
FIG. 14 depicts an example haptic spoke plate attached to a shaft in accordance with one or more embodiments.

FIG. 14 depicts the haptic spoke plate 1300 attached to a shaft 502 in accordance with one or more implementations. Further depicted are the haptic element 1304a on the spoke 1304a, and the haptic element 1302c on the spoke 1304c. The haptic element 1302b and the spoke 1304b are obscured by the shaft 502 in this view.

Figure 15:
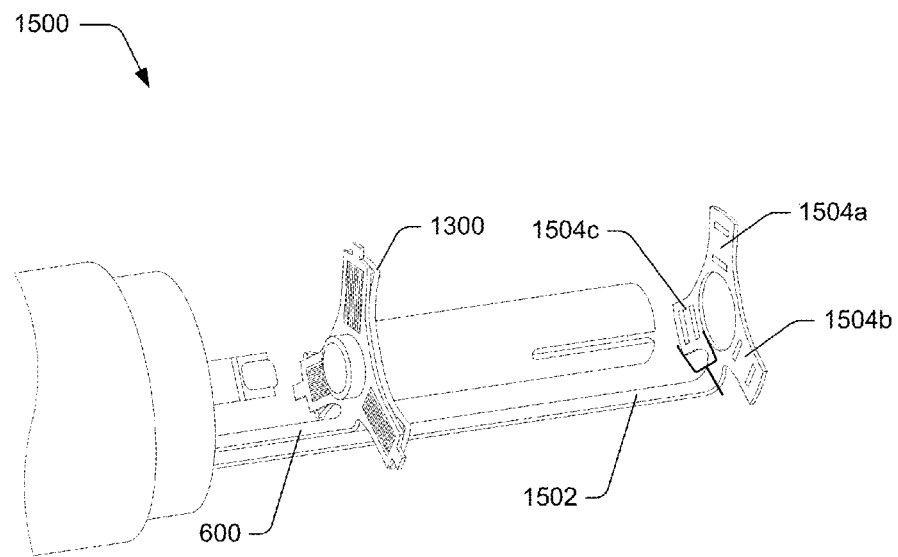
FIG. 15 depicts an example exploded view of a portion of a pen in accordance with one or more embodiments.

FIG. 15 depicts an example exploded view 1500 of a portion of the pen 120 in accordance with one or more implementations. Depicted here is the flexible circuit 600 attached to the haptic spoke plate 1300, discussed above. Attributes of the flexible circuit 600 are detailed above and include various sensor elements for implementing the strain sensor 302. Further illustrated is a haptic circuit 1502, which represents a flexible circuit utilized to provide electrical connectivity to the haptic elements 1302a-1302c introduced above. The haptic circuit 1502, for instance, is connected to one or more of the electronic components 210 and the haptic elements 1302a-1302c. According to various implementations, the haptic circuit 1502 passes through a gap between spokes in the haptic spoke plate 1300.

The haptic circuit 1502 includes haptic contacts 1504a, haptic contacts 1504b, and haptic contacts 1504c. Generally, the haptic contacts 1504a-1504c represent electrical contacts for providing electrical conductivity from the power supply 212 to the haptic elements 1302a-1302c. In a fabrication of the pen 120, each of the haptic contacts 1504a-1504c may be connected and/or bonded to a respective instance of the haptic elements 1302a-1302c in various ways, such as using an electrically conductive adhesive, laser bonding, thermal bonding, and so forth.

Figure 16:
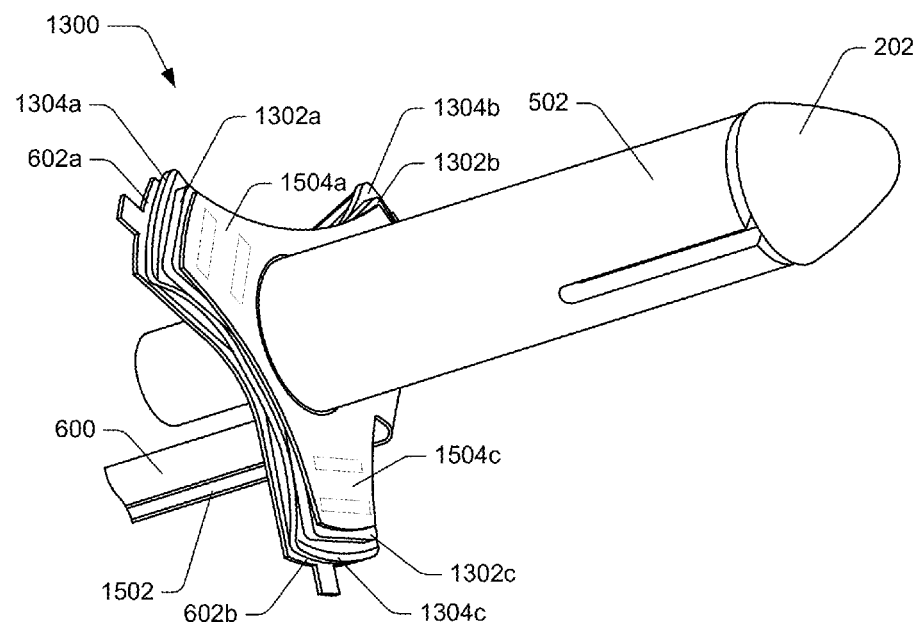
FIG. 16 depicts various internal components of a pen in accordance with one or more embodiments.

FIG. 16 depicts various internal components 208 of the pen 120 in accordance with one or more implementations. For instance, the tip 202 is positioned at least partially within the shaft 502. Further illustrated is the haptic circuit 1502 attached to the haptic spoke plate 1300 with the haptic contacts 1504a attached to the haptic element 1302a, and the haptic contacts 1504c attached to the haptic element 1302c. Although not expressly illustrated in this view, the haptic contacts 1504b are attached to the haptic element 1302b.

According to various implementations, each of the haptic contacts 1504a-1504c is separately controllable (e.g., energizable and/or activatable) to enable a variety of different haptic forces to be applied to the pen 120. For instance, voltage applied to a particular haptic contact 1504a-1504c causes a respective haptic element 1302a-1302c to vibrate and generate haptic force that is transmitted from the haptic spoke plate 1300 to the shaft 502, and across the shaft 502 to the tip 202. Generally, haptic force applied to the tip 202 causes the tip 202 to interact with an adjacent input surface in various ways.

FIG. 16 further depicts the flexible circuit 600 attached to the haptic spoke plate 1300. As discussed above, the flexible circuit 600 includes the sensor elements 602a-602c. In this particular example, the sensor element 602a is attached to the spoke 1304a on a side of the haptic spoke plate 1300 opposite the haptic element 1302a, the sensor element 602b is attached to the spoke 1304c on a side of the haptic spoke plate 1300 opposite the haptic element 1302c, and the sensor element 602c (not shown in this view) is attached to the spoke 1304b on a side of the haptic spoke plate 1300 opposite the haptic element 1302b. Thus, the haptic motor 1202 and the strain sensor 302 may be implemented in conjunction with one another in an implementation of the pen 120. This is not to be construed as limiting, however, and other implementations of the pen 120 may include the haptic motor 1202 without the strain sensor 302, and vice-versa.

Figure 17:
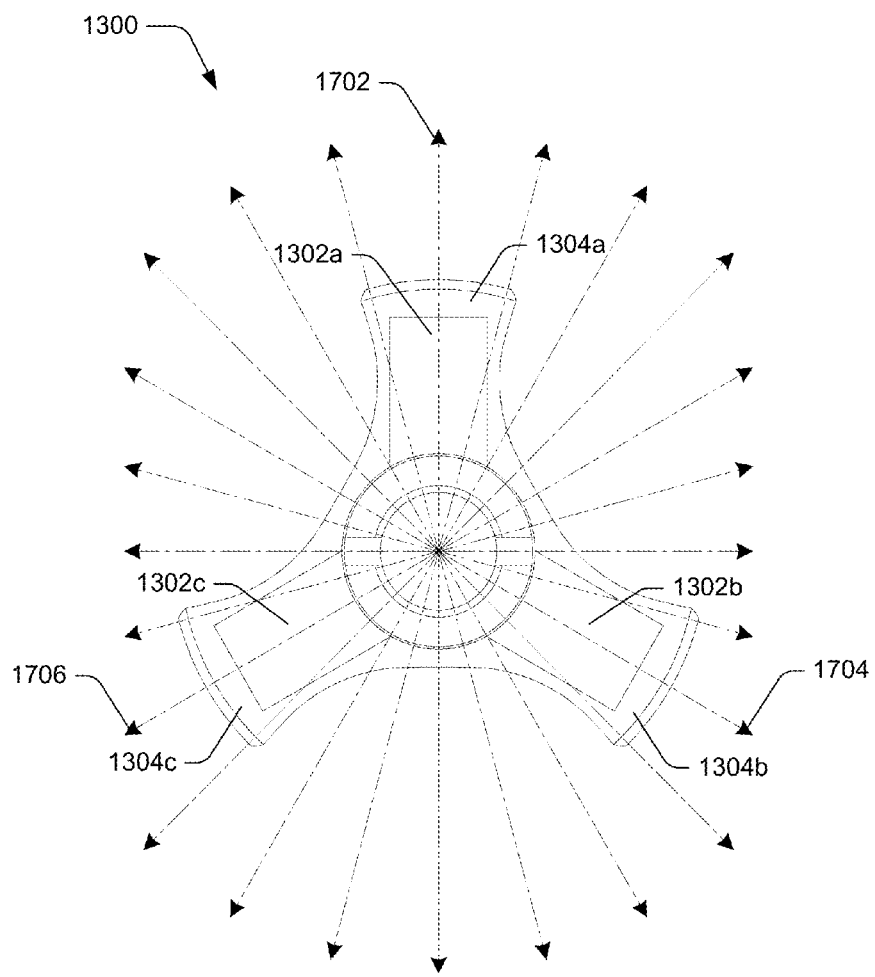
FIG. 17 depicts examples of different planes of movement through which a haptic spoke plate can be pulsed via activation of different haptic elements in accordance with one or more embodiments.

FIG. 17 depicts examples of different planes of movement through which the haptic spoke plate 1300 can be pulsed via activation of the different haptic elements 1302a-1302c. The different planes of movement are represented as lines through the center of the haptic spoke plate 1300. As discussed above, vibration of the haptic spoke plate 1300 causes vibration of the shaft 502, which in turn causes a corresponding vibration of the tip 202.

According to various implementations, a particular plane of movement through which the haptic spoke plate 1300 vibrates depends on which of the haptic elements 1302a-1302c is activated, and/or an order in which the haptic elements 1302a-1302c are activated. For instance, vibration within a plane 1702 may be caused by alternating between activating the haptic element 1302a, and activating the haptic elements 1302b, 1302c together. Further, vibration within a plane 1704 may be caused by alternating between activating the haptic element 1302b, and activating the haptic elements 1302a, 1302c together. Still further, vibration within a plane 1706 may be caused by alternating between activating the haptic element 1302c, and activating the haptic elements 1302a, 1302b together.

According to various implementations, vibration within other planes can be caused by modulating the voltage applied to the different haptic elements 1302a-1302c. For instance, vibration within the planes between the planes 1702, 1704, and 1706 can be caused by simultaneously applying different voltages to different of the haptic elements 1302a-1302c, and by cycling between different combinations of the haptic elements 1302a-1302c.

As yet another example, vibration along a longitudinal axis of the pen 120 can be caused by pulsing all of the haptic elements 1302a-1302c on and off together, such as to create a jackhammering effect that is parallel to the longitudinal axis of the pen 120.

According to various implementations, the different planes depicted in FIG. 17 can also correspond to different detected directions of movement of a handheld input apparatus. For instance, utilizing techniques discussed above to measure strain on a particular spoke and/or combination of spokes, a direction of movement of the tip 202 across an input surface can be determined. Consider, for instance, that radial load on the spoke 1304a is measured to be greater than that on the spokes 1304b, 1304c. Accordingly, a determination is made that the tip 202 is moving in a direction of the plane 1702, e.g., according to a radial line extending from the center of the haptic spoke plate 1300 and longitudinally through a center the spoke 1304a. Thus, different strain measurements on the different spokes 1304a-1304c can be measured to determine a relative direction of movement of the pen 120, such as according to one or more of the planes depicted in FIG. 17. As discussed below, direction of movement of the pen 120 can be utilized to determine a particular haptic mode to be applied to the pen 120.

Figure 18:
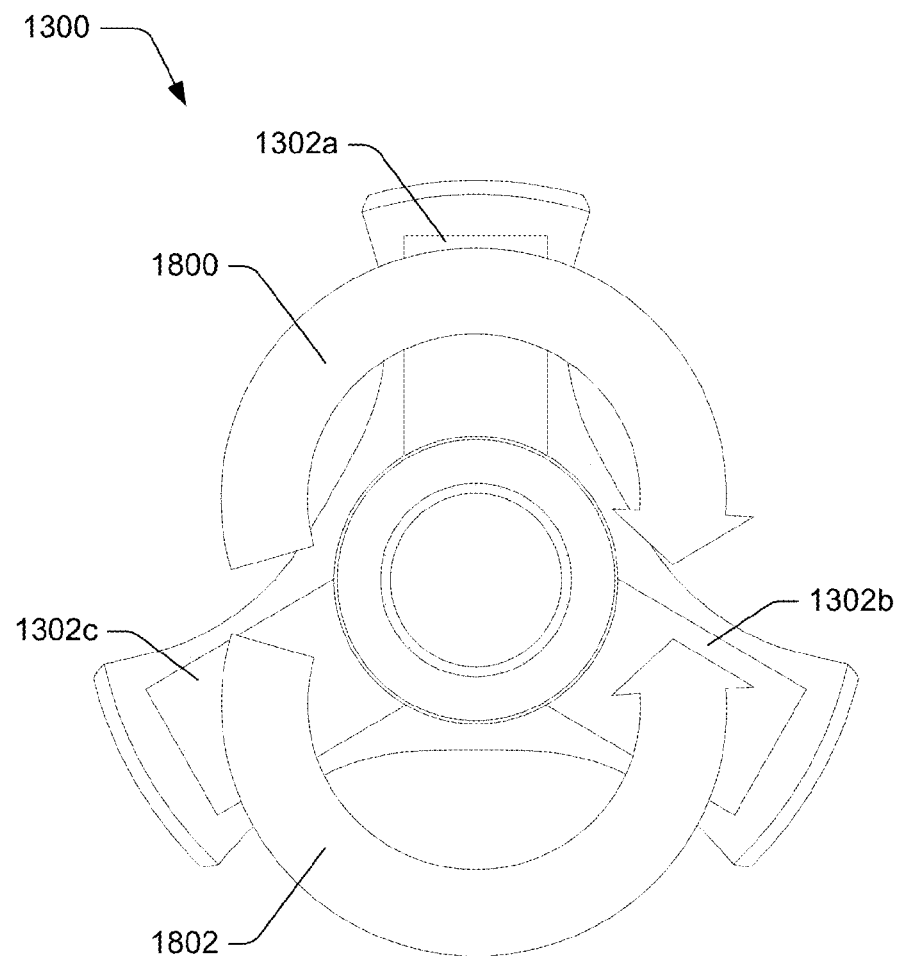
FIG. 18 depicts examples of rotational movement through which a haptic spoke plate can be pulsed via activation of different haptic elements in accordance with one or more embodiments.

FIG. 18 depicts examples of rotational movement through which the haptic spoke plate 1300 can be pulsed via activation of the different haptic elements 1302a-1302c. The haptic spoke plate 1300, for instance, can be vibrated in a clockwise direction 1800 by alternately activating and deactivating the haptic elements 1302a-1302c in a clockwise order. Further, the haptic spoke plate 1300 can be vibrated in a counterclockwise direction 1802 by alternately activating and deactivating the haptic elements 1302a-1302c in a counter clockwise order. In at least some implementations, vibration of the haptic spoke plate 1300 in a clockwise or counterclockwise direction causes nutation of the tip 202 along a particular path of movement of the tip 202.

Thus, implementations discussed herein enable for accurate force measurements for a handheld apparatus to be captured in multiple dimensions relative to the apparatus. Further, implementations discussed herein enable different angular and rotational orientations of a handheld apparatus relative to an adjacent surface to be determined. Force measurements and orientation information can be used and/or combined to provide diverse input scenarios for a handheld input apparatus.

Further, implementations discussed herein provide a haptic motor that is controllable to apply different haptic forces to a tip of a handheld apparatus. By controlling haptic forces applied to the tip, different interactions between the tip and an adjacent surface can be generated.

Having discussed aspects of an example pen, strain sensor, and haptic motor, consider now some example procedures in accordance with one or more implementations.

Example Procedures

The following discussion describes some example procedures in accordance with one or more embodiments. The example procedures may be employed in the environment 100 of FIG. 1, the system 2300 of FIG. 23, and/or any other suitable environment. In at least some implementations, the steps described for the various procedures can be implemented automatically and independent of user interaction. The procedures, for instance, represent example ways of performing various aspects of the implementation scenarios described above. The procedures may be performed in various ways, such as by the touch device module 118, the pen module 220, and/or via interaction between the touch device module 118 and the pen module 220.

Figure 19:
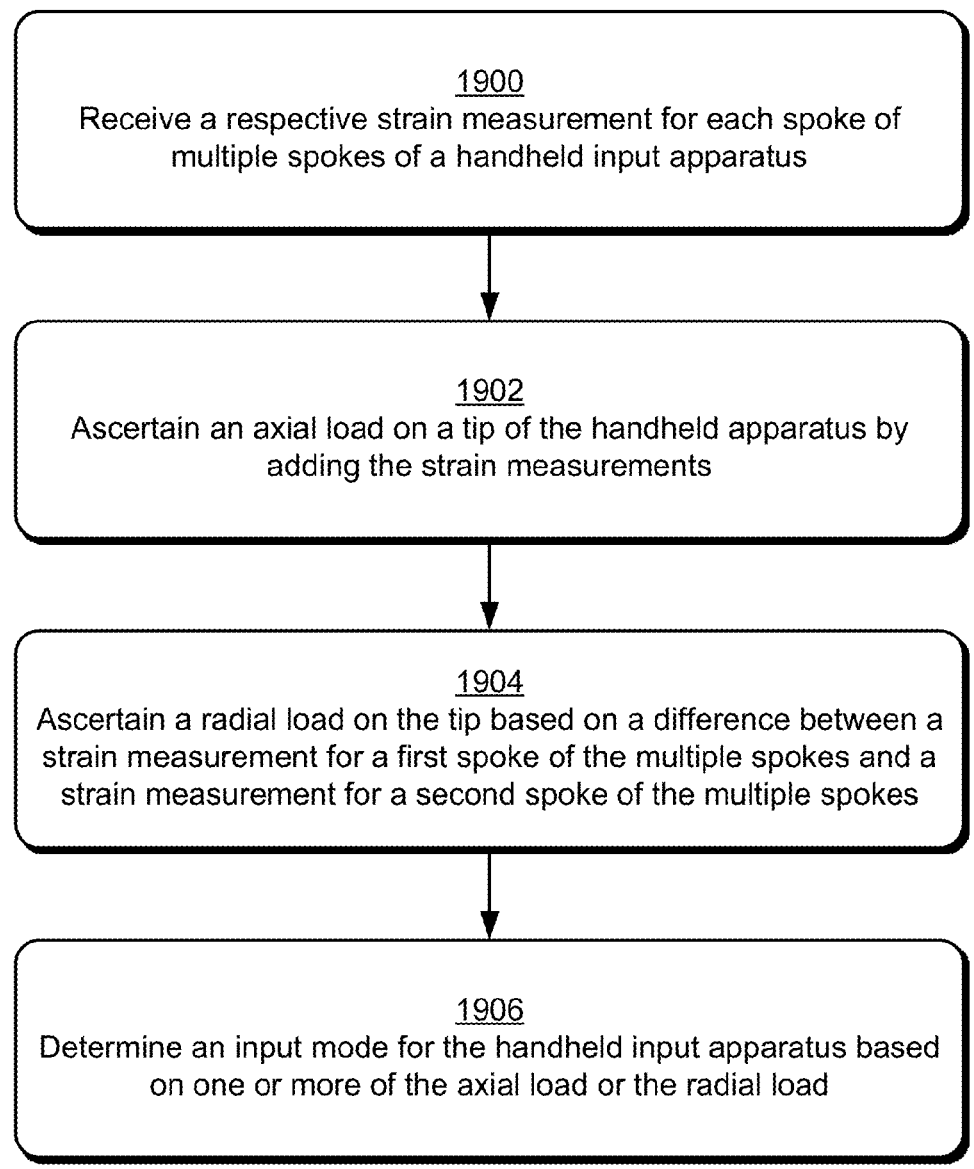
FIG. 19 is a flow diagram that describes steps in a method for determining force applied to a tip of a handheld apparatus in accordance with one or more embodiments.

FIG. 19 is a flow diagram that describes steps in a method in accordance with one or more embodiments. The method, for instance, describes an example procedure for determining force applied to a tip of a handheld apparatus in accordance with one or more implementations. In at least some implementations, the method of FIG. 12 may be performed by the display device 110 and/or by the pen 120.

Step 1900 receives a respective strain measurement for each spoke of multiple spokes of a handheld input apparatus. For instance, strain measurements from each of the sensor elements 602a-602c are captured in response to detecting the tip 202 in contact with an input surface.

Step 1902 ascertains an axial load on a tip of the handheld apparatus by adding the strain measurements. The strain measurement values, for example, are added together to determine a cumulative axial load on the tip 202.

Step 1904 ascertains a radial load on the tip based on a difference between a strain measurement for a first spoke of the multiple spokes and a strain measurement for a second spoke of the multiple spokes. The strain measurement for the first spoke, for instance, is subtracted from the strain measurement for the second spoke to obtain a load difference value. An absolute value of the load difference value is used to determine the radial load. While this example is discussed with reference to a difference between strain measurements on two spokes, it is to be appreciated that implementations discussed herein can be utilized to determine a difference between strain measurements on multiple (more than two) spokes.

Step 1906 determines an input mode for the handheld input apparatus based on one or more of the axial load or the radial load. For instance, the axial load and/or the radial load can be used to determine an attribute of digital ink applied by the handheld input apparatus, such as line width, line shading, line texture, and so forth.

In at least some implementations, a direction of movement of the handheld input apparatus across an input surface can be determined based on the axial load and/or the radial load. For instance, a higher radial load on a particular spoke can indicate that the tip 202 of the pen 120 is moving in a direction indicated by a radial line extending longitudinally through the particular spoke. A determined direction of movement of a handheld apparatus can be used in various ways, such as to determine an input mode, to control movement of a graphical element displayed on the display device 110, to determine a haptic mode, and so forth.

Figure 20:
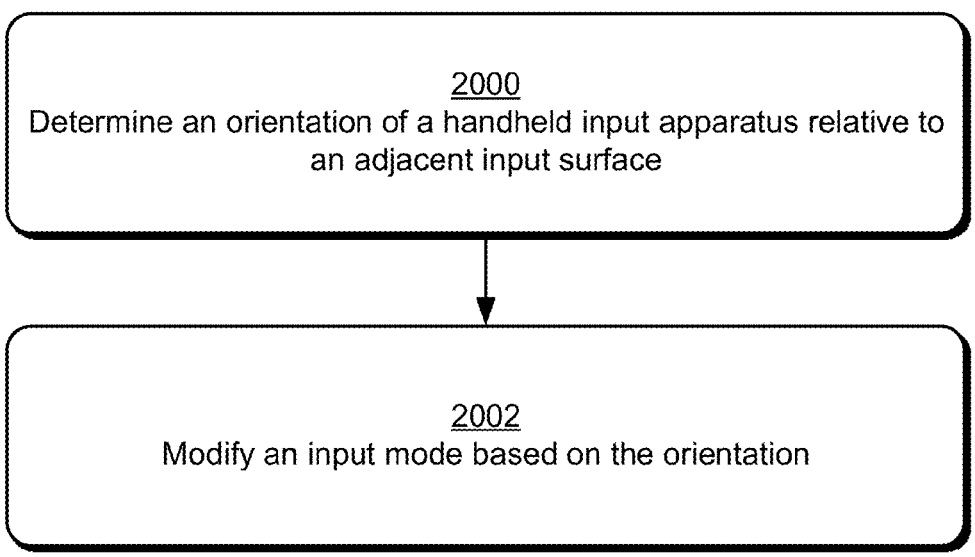
FIG. 20 is a flow diagram that describes steps in a method for determining an orientation of a handheld apparatus in accordance with one or more embodiments.

FIG. 20 is a flow diagram that describes steps in a method in accordance with one or more embodiments. The method, for instance, describes an example procedure for determining an orientation of a handheld apparatus in accordance with one or more implementations. In at least some implementations, the method describes an extension and/or variation of the method described above with reference to FIG. 19. In at least some implementations, the method of FIG. 20 may be performed by the display device 110 and/or by the pen 120.

Step 2000 determines an orientation of a handheld input apparatus relative to an adjacent input surface. The orientation, for instance, includes one or more of an angular orientation or a rotational orientation. Example ways of determining angular and rotational orientation are described above.

Step 2002 modifies an input mode of the handheld input apparatus based on the orientation. For example, angular orientation and/or rotational orientation can be used to determine an attribute of digital ink applied by the handheld input apparatus, such as line width, line shading, line texture, and so forth. In at least some implementations, load information as determined above can be combined with orientation information to control different input characteristics of the handheld input apparatus.

Figure 21:
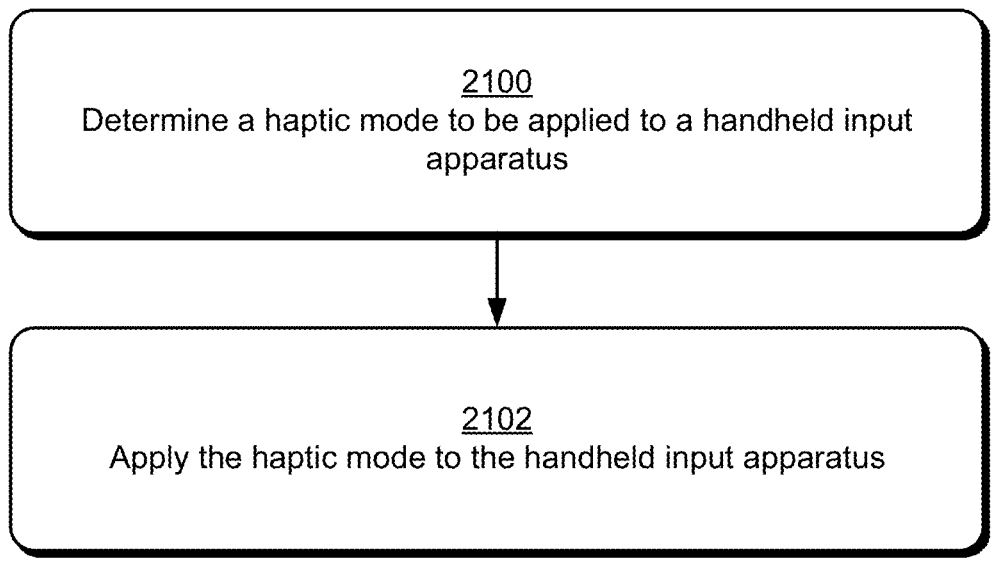
FIG. 21 is a flow diagram that describes steps in a method for generating haptic force for a handheld apparatus in accordance with one or more embodiments.

FIG. 21 is a flow diagram that describes steps in a method in accordance with one or more embodiments. The method, for instance, describes an example procedure for generating haptic force for a handheld apparatus in accordance with one or more implementations. In at least some implementations, the method describes an extension and/or variation of the methods described above with reference to FIGS. 19 and 20. In at least some implementations, the method of FIG. 21 may be performed by the client device 102 and/or by the pen 120.

Step 2100 determines a haptic mode to be applied to a handheld input apparatus. Generally, a haptic mode may be specified to produce a particular tip interaction with an adjacent input surface, such as an interaction of the tip 202 with the surface of the display device 110. For instance, a haptic mode may identify a plane in which the tip 202 is to vibrate, such as one or more of the planes depicted in FIG. 17. Alternatively, a haptic mode may identify a rotational movement of the tip 202, such as a clockwise and/or counterclockwise rotation of the tip 202.

Generally, different haptic modes may affect a movement of the tip 202 across an input surface, such as by changing a coefficient of friction that characterizes resistance of movement of the tip 202 across an input surface. For instance, vibrating the tip 202 in a same direction that the pen 120 is being moved across an input surface can reduce a coefficient of friction between the tip 202 and the input surface. Reducing the coefficient of friction can decrease resistance to movement of the tip 202, and thus require less force from a user to move the tip 202 across the input surface than would be required if no haptic force were applied to the tip 202. In another implementation, vibrating the tip 202 in a different (e.g., opposite) direction than the pen 120 is being moved across an input surface can increase a coefficient of friction between the tip 202 and the input surface. Increasing the coefficient of friction can increase resistance to movement of the tip 202, and thus require more force from a user to move the tip 202 across the input surface than would be required if no haptic force were applied to the tip 202.

According to various implementations, a haptic mode for a handheld apparatus can be determined in various ways. For instance, the operating system 104 and/or an application 106 can specify the haptic mode based on a current context for the operating system 104 and/or the application 106. In another example, a user may select a particular haptic mode from multiple different haptic modes. In at least some implementations, a haptic mode to be applied by the haptic motor 1202 can be communicated from the touch device module 118 to the pen module 220, such as via wireless communication between the client device 102 and the pen 120. Alternatively or additionally, the pen module 220 may determine the haptic mode, such as based on a detected direction of movement of the pen 120.

Step 2102 applies the haptic mode to the handheld input apparatus. The pen module 220, for instance, controls the haptic motor 1202 to generate haptic force that is transferred to the tip 202. For example, the pen module 220 applies power to one or more of the haptic elements 1302a-1302c to generate a particular haptic response at the tip 202 and based on the particular haptic mode. Different haptic responses are discussed above, such as vibration in a particular plane relative to the haptic spoke plate 1300, rotation in a particular direction relative to the haptic spoke plate 1300, vibration along a longitudinal axis of the pen 120, and so forth. As mentioned above, applying the haptic mode to the pen 120 can change an interaction of the tip 202 with an input surface, such as by changing a coefficient of friction between the tip 202 and the input surface.

Figure 22:
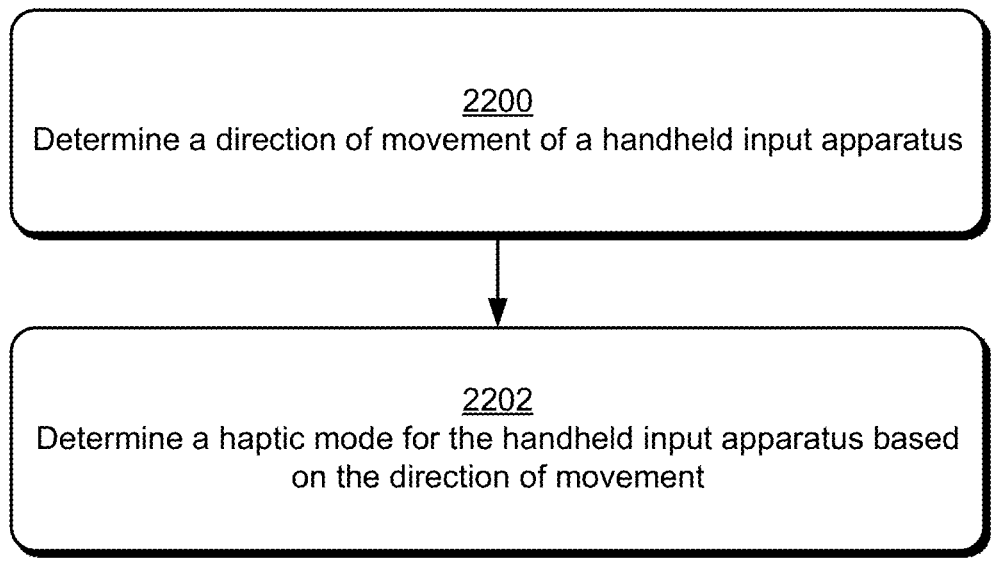
FIG. 22 is a flow diagram that describes steps in a method for determining a haptic mode for a handheld input apparatus in accordance with one or more embodiments.

FIG. 22 is a flow diagram that describes steps in a method in accordance with one or more embodiments. The method, for instance, describes an example procedure for determining a haptic mode for a handheld input apparatus in accordance with one or more implementations. In at least some implementations, the method describes an extension and/or variation of the methods described above with reference to FIGS. 19-21. The method, for instance, describes an example way of performing step 2100 of FIG. 21. In at least some implementations, the method of FIG. 22 may be performed by the client device 102 and/or by the pen 120.

Step 2200 determines a direction of movement of a handheld input apparatus. As discussed above, direction of movement may be determined based on radial load and/or axial load as determined using the strain sensor 302. Generally, "direction of movement" of the pen 120 refers to a direction that the tip 202 is moving relative to an input surface.

In at least some implementations, when the haptic motor 1202 is being activated to generate a haptic interaction, the haptic motor 1202 can be temporarily deactivated while strain measurements are being collected. For instance, the pen module 220 can alternate between activating the haptic motor 1202 to generate haptic motion, and activating the strain sensor 302 to collect strain measurements.

Step 2202 determines a haptic mode for the handheld input apparatus based on the direction of movement. Generally, a haptic mode can be specified to affect a tactile response of the tip 202 against an input surface. For instance, generating haptic force in a same direction of movement of the tip 202 can decrease resistance of movement of the tip 202 in the direction of movement, thus requiring less force from a user to move the pen 120 in the direction of movement than would be required if no haptic force were applied to the tip 202. As another example, generating haptic force in a different (e.g., opposite) direction of movement of the tip 202 can increase resistance of movement of the tip 202 in the direction of movement, thus requiring more force from a user to move the pen 120 in the direction of movement than would be required if no haptic force were applied to the tip 202.

In at least some implementations, different haptic modes can simulate different tip effects with an input surface, such as different paint brushes, different paint types, different surface textures and/or materials, different pen and/or pencil types, and so forth. Thus, different haptic interactions between a handheld input apparatus and an input surface can be generated to provide diverse input scenarios.

Having described some example procedures for a handheld input apparatus, consider now a discussion of an example system and device in accordance with one or more embodiments.

Example System and Device

Figure 23:
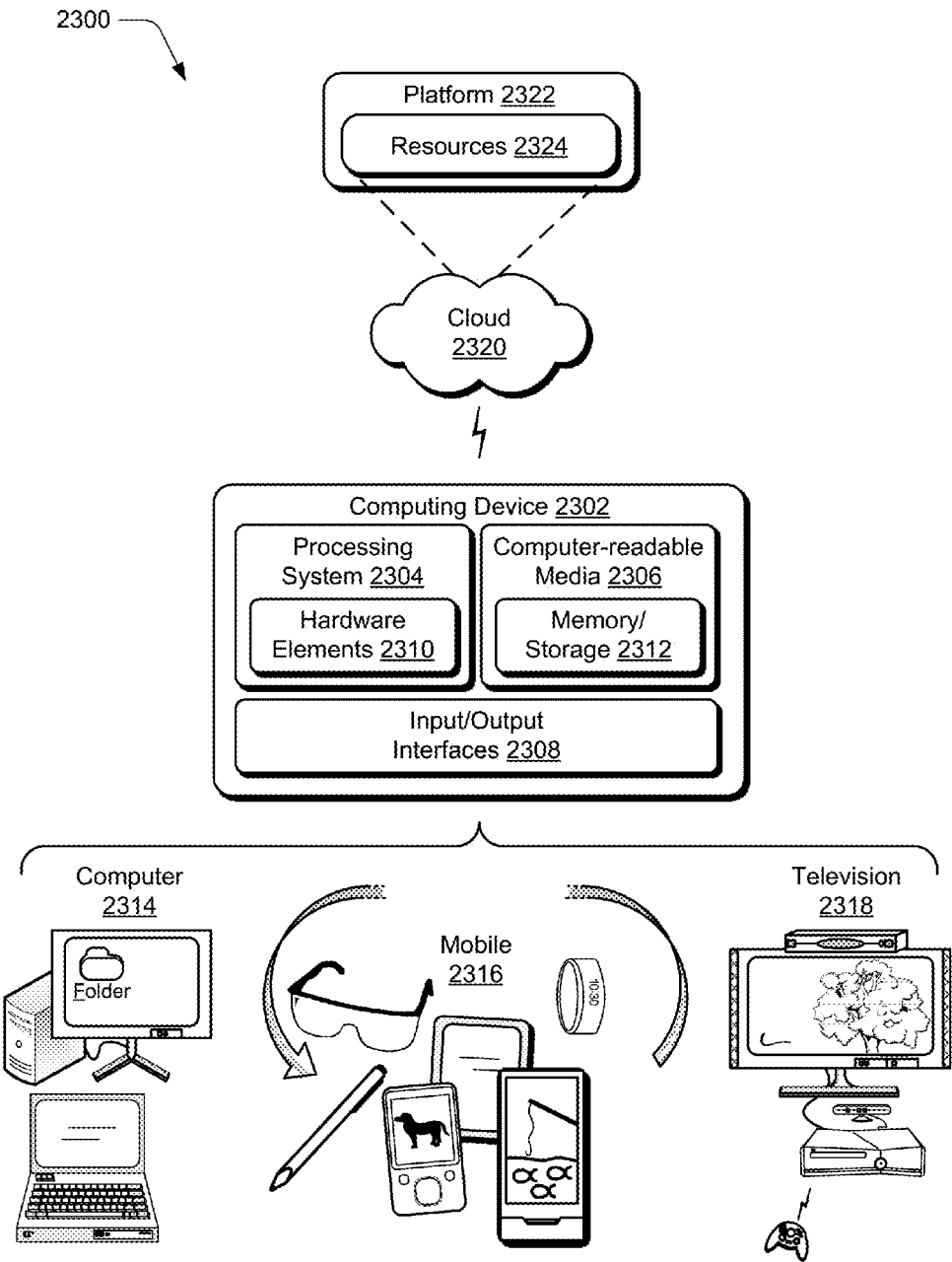
FIG. 23 illustrates an example system and computing device as described with reference to FIG. 1, which are configured to implement embodiments of techniques described herein.

FIG. 23 illustrates an example system generally at 2300 that includes an example computing device 2302 that is representative of one or more computing systems and/or devices that may implement various techniques described herein. For example, the client device 102 and/or the pen 120 discussed above with reference to FIG. 1 can be embodied as the computing device 2302. The computing device 2302 may be, for example, a server of a service provider, a device associated with the client (e.g., a client device), an on-chip system, and/or any other suitable computing device or computing system.

The example computing device 2302 as illustrated includes a processing system 2304, one or more computer-readable media 2306, and one or more Input/Output (I/O) Interfaces 2308 that are communicatively coupled, one to another. Although not shown, the computing device 2302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2304 is representative of functionality to perform one or more operations using hardware. Accordingly, the processing system 2304 is illustrated as including hardware element 2310 that may be configured as processors, functional blocks, and so forth. This may include implementation in hardware as an application specific integrated circuit or other logic device formed using one or more semiconductors. The hardware elements 2310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2306 is illustrated as including memory/storage 2312. The memory/storage 2312 represents memory/storage capacity associated with one or more computer-readable media. The memory/storage 2312 may include volatile media (such as random access memory (RAM)) and/or nonvolatile media (such as read only memory (ROM), Flash memory, optical disks, magnetic disks, and so forth). The memory/storage 2312 may include fixed media (e.g., RAM, ROM, a fixed hard drive, and so on) as well as removable media (e.g., Flash memory, a removable hard drive, an optical disc, and so forth). The computer-readable media 2306 may be configured in a variety of other ways as further described below.

Input/output interface(s) 2308 are representative of functionality to allow a user to enter commands and information to computing device 2302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 2302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 2310 and computer-readable media 2306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 2310. The computing device 2302 may be configured to implement particular instructions and/or functions corresponding to the software and/or hardware modules. Accordingly, implementation of modules that are executable by the computing device 2302 as software may be achieved at least partially in hardware, e.g., through use of computer-readable storage media and/or hardware elements 2310 of the processing system. The instructions and/or functions may be executable/operable by one or more articles of manufacture (for example, one or more computing devices 2302 and/or processing systems 2304) to implement techniques, modules, and examples described herein.

As further illustrated in FIG. 23, the example system 2300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2302 may assume a variety of different configurations, such as for computer 2314, mobile 2316, and television 2318 uses. Each of these configurations includes devices that may have generally different constructs and capabilities, and thus the computing device 2302 may be configured according to one or more of the different device classes. For instance, the computing device 2302 may be implemented as the computer 2314 class of a device that includes a personal computer, desktop computer, a multi-screen computer, laptop computer, netbook, and so on.

The computing device 2302 may also be implemented as the mobile 2316 class of device that includes mobile devices, such as a mobile phone, portable music player, portable gaming device, a tablet computer, a wearable device, a multi-screen computer, and so on. The computing device 2302 may also be implemented as the television 2318 class of device that includes devices having or connected to generally larger screens in casual viewing environments. These devices include televisions, set-top boxes, gaming consoles, and so on.

The techniques described herein may be supported by these various configurations of the computing device 2302 and are not limited to the specific examples of the techniques described herein. For example, functionalities discussed with reference to the client device 102 and/or the pen 120 may be implemented all or in part through use of a distributed system, such as over a "cloud" 2320 via a platform 2322 as described below.

The cloud 2320 includes and/or is representative of a platform 2322 for resources 2324. The platform 2322 abstracts underlying functionality of hardware (e.g., servers) and software resources of the cloud 2320. The resources 2324 may include applications and/or data that can be utilized while computer processing is executed on servers that are remote from the computing device 2302. Resources 2324 can also include services provided over the Internet and/or through a subscriber network, such as a cellular or Wi-Fi network.

The platform 2322 may abstract resources and functions to connect the computing device 2302 with other computing devices. The platform 2322 may also serve to abstract scaling of resources to provide a corresponding level of scale to encountered demand for the resources 2324 that are implemented via the platform 2322. Accordingly, in an interconnected device embodiment, implementation of functionality described herein may be distributed throughout the system 2300. For example, the functionality may be implemented in part on the computing device 2302 as well as via the platform 2322 that abstracts the functionality of the cloud 2320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A handheld input apparatus including: a body portion; a spoke plate fastened within the body and having multiple spokes that extend radially from a center of the spoke plate toward an interior surface of the body; a shaft positioned in the center of the spoke plate and extending longitudinally from the spoke plate toward a nose portion of the body; a tip fastened partially within the shaft and extending through the nose; multiple haptic elements that are each positioned on a different respective spoke of the multiple spokes; and a haptic circuit including multiple haptic contacts that are each attached to a different respective haptic element of the multiple haptic elements, the haptic contacts each being configured to conduct electrical current to a different respective haptic element such that each haptic element is independently activatable to control a haptic response of the tip.

Example 2

The handheld input apparatus of example 1, wherein the shaft is fastened within an aperture in the center of the spoke plate.

Example 3

The handheld input apparatus of one or more of examples 1 or 2, wherein the shaft partially extends through an aperture in the nose such that the tip protrudes from the nose.

Example 4

The handheld input apparatus of one or more of examples 1-3, wherein the shaft partially extends through an aperture in the nose, and wherein a circumference of the aperture is such that a gap exists between a surface of the aperture and a peripheral surface of the shaft that extends through the aperture.

Example 5

The handheld input apparatus of one or more of examples 1-4, wherein the haptic elements include piezoelectric elements bonded to a surface of each of the spokes.

Example 6

The handheld input apparatus of one or more of examples 1-5, further including: a power supply; and a module configured to control a flow of power from the power supply across the haptic circuit to the haptic elements to cause activation of one or more of the haptic elements.

Example 7

The handheld input apparatus of one or more of examples 1-6, further including a module configured to determine a haptic mode for the handheld input apparatus, and to cause activation of one or more of the haptic elements based on the haptic mode.

Example 8

The handheld input apparatus of one or more of examples 1-7, further including a strain sensor configured to enable strain force on the tip to be measured, the strain force being usable to determine a direction of movement of the tip relative to an input surface, and the direction of movement being usable to determine a haptic mode for controlling activation of one or more of the haptic elements.

Example 9

The handheld input apparatus of one or more of examples 1-8, further including a strain sensor including: a strain circuit including multiple strain sensor elements that are each attached to a different individual spoke of the multiple spokes, each strain sensor element being positioned to measure strain force on a respective spoke such that a direction of movement of the tip relative to an input surface is determinable based on strain force on one or more of the spokes, and the direction of movement being usable to determine a haptic mode for controlling activation of one or more of the haptic elements.

Example 10

The handheld input apparatus of one or more of examples 1-9, further including: a strain sensor including a strain circuit with multiple strain sensor elements that are each attached to a different individual spoke of the multiple spokes; and a module configured to: receive strain measurements from each of the strain sensor elements; determine a strain force on one or more of the spokes based on one or more strain measurements for the one or more spokes; determine a direction of movement of the tip based on the strain force; and determine a haptic mode for controlling activation of one or more of the haptic elements based on the direction of movement.

Example 11

A handheld input apparatus including: a body portion with a nose portion; a tip extending at least partially through the nose; a strain sensor configured to enable strain force on the tip to be measured; and a haptic motor configured to apply haptic force to the tip based at least in part on the strain force on the tip measured by the strain sensor.

Example 12

The handheld input apparatus as described in example 11, wherein the strain force on the tip indicates a direction of movement of the tip relative to an adjacent surface, and wherein the haptic motor is configured to apply the haptic force to the tip based on the direction of movement of the tip.

Example 13

The handheld input apparatus as described in one or more of examples 11 or 12, further including a module configured to determine a strain force on the tip based on one or more strain measurements received from the strain sensor, and to control a haptic mode of the haptic motor based on the strain force on the tip.

Example 14

The handheld input apparatus as described in one or more of examples 11-13, further including: a spoke plate fastened within the body and having multiple spokes that extend radially from a center of the spoke plate toward an interior surface of the body; a shaft being positioned in the center of the spoke plate and extending longitudinally from the spoke plate toward the nose, the tip being fastened to the shaft and extending from the shaft at least partially through the nose; and a sensor circuit including multiple strain sensor elements that are each attached to a different individual spoke of the multiple spokes and that form at least a portion of the strain sensor, each strain sensor element being positioned to measure strain on a respective spoke.

Example 15

The handheld input apparatus as described in one or more of examples 11-14, further including: a spoke plate fastened within the body and having multiple spokes that extend radially from a center of the spoke plate toward an interior surface of the body; a shaft being positioned in the center of the spoke plate and extending longitudinally from the spoke plate toward the nose, the tip being fastened to the shaft and extending from the shaft at least partially through the nose; and a haptic circuit including multiple haptic elements that are each attached to a different individual spoke of the multiple spokes and that form at least a portion of the haptic motor, each haptic element being positioned to generate haptic force on a respective spoke.

Example 16

The handheld input apparatus as described in one or more of examples 11-15, further including: a spoke plate fastened within the body and having multiple spokes that extend radially from a center of the spoke plate toward an interior surface of the body; a shaft being positioned in the center of the spoke plate and extending longitudinally from the spoke plate toward the nose, the tip being fastened to the shaft and extending from the shaft at least partially through the nose; a sensor circuit including multiple strain sensor elements that are each attached to a different individual spoke of the multiple spokes and that form at least a portion of the strain sensor, each strain sensor element being positioned to measure strain on a respective spoke; and a haptic circuit including multiple haptic elements that are each attached to a different individual spoke of the multiple spokes and that form at least a portion of the haptic motor, each haptic element being positioned to generate haptic force on a respective spoke.

Example 17

A computer-implemented method for causing a haptic interaction between a handheld input apparatus and an input surface, the method including: determining a direction of movement of a handheld input apparatus relative to an input surface based at least in part on a strain measurement received from a strain sensor of the handheld input apparatus; determining a haptic mode to be applied to the handheld input apparatus based at least in part on the direction of movement of the handheld input apparatus; and applying the haptic mode to the handheld input apparatus to cause a haptic interaction between a tip of the handheld input apparatus and the input surface.

Example 18

A computer-implemented method as described in example 17, wherein the direction of movement is determined by comparing strain force measurements from multiple strain sensor elements of the strain sensor.

Example 19

A computer-implemented method as described in one or more of examples 17 or 18, wherein the haptic mode identifies a plane in which the tip is to vibrate.

Example 20

A computer-implemented method as described in one or more of examples 17-19, wherein the haptic mode identifies rotational movement of the tip.

CONCLUSION

Techniques for haptics for a handheld input apparatus are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A handheld input apparatus comprising:
a body portion;
a spoke plate fastened within the body and having multiple spokes that extend radially from a center of the spoke plate toward an interior surface of the body;
a shaft positioned in the center of the spoke plate and extending longitudinally from the spoke plate toward a nose portion of the body;
a tip fastened partially within the shaft and extending through the nose;
multiple haptic elements that are each positioned on a different respective spoke of the multiple spokes; and
a haptic circuit including multiple haptic contacts that are each attached to a different respective haptic element of the multiple haptic elements, the haptic contacts each being configured to conduct electrical current to such that each haptic element is independently activatable to control a haptic response of the tip.

2. The handheld input apparatus of claim 1, wherein the shaft is fastened within an aperture in the center of the spoke plate.

3. The handheld input apparatus of claim 1, wherein the shaft partially extends through an aperture in the nose such that the tip protrudes from the nose.

4. The handheld input apparatus of claim 1, wherein the shaft partially extends through an aperture in the nose, and wherein a circumference of the aperture is such that a gap exists between a surface of the aperture and a peripheral surface of the shaft that extends through the aperture.

5. The handheld input apparatus of claim 1, wherein the haptic elements comprise piezoelectric elements bonded to a surface of each of the spokes.

6. The handheld input apparatus of claim 1, further comprising:
a power supply; and
control logic stored in memory and configured to control a flow of power from the power supply across the haptic circuit to the haptic elements to cause activation of one or more of the haptic elements.

7. The handheld input apparatus of claim 1, further comprising control logic stored in memory and configured to determine a haptic mode for the handheld input apparatus, and to cause activation of one or more of the haptic elements based on the haptic mode.

8. The handheld input apparatus of claim 1, further comprising a strain sensor configured to enable strain force on the tip to be measured, the strain force being usable to determine a direction of movement of the tip relative to an input surface, and the direction of movement being usable to determine a haptic mode for controlling activation of one or more of the haptic elements.

9. The handheld input apparatus of claim 1, further comprising a strain sensor including:
a strain circuit including multiple strain sensor elements that are each attached to a different individual spoke of the multiple spokes, each strain sensor element being positioned to measure strain force on a respective spoke such that a direction of movement of the tip relative to an input surface is determinable based on strain force on one or more of the spokes, and the direction of movement being usable to determine a haptic mode for controlling activation of one or more of the haptic elements.

10. The handheld input apparatus of claim 1, further comprising:
a strain sensor including a strain circuit with multiple strain sensor elements that are each attached to a different individual spoke of the multiple spokes; and
control logic stored in memory and configured to:
receive strain measurements from each of the strain sensor elements;
determine a strain force on one or more of the spokes based on one or more strain measurements for the one or more spokes;
determine a direction of movement of the tip based on the strain force; and
determine a haptic mode for controlling activation of one or more of the haptic elements based on the direction of movement.

11. An apparatus comprising:
a body portion with a nose portion;
a spoke plate fastened within the body and having multiple spokes that extend radially from a center of the spoke plate toward an interior surface of the body;
a shaft being positioned in the center of the spoke plate and extending longitudinally relative to the body from the spoke plate toward the nose;
a tip fastened to the shaft and extending at least partially through the nose;
a sensor circuit including multiple strain sensor elements that are each attached to a different individual spoke of the multiple spokes and that form at least a portion of a strain sensor, each strain sensor element being positioned to measure strain on a respective spoke; and
a haptic motor configured to apply haptic force to the tip based at least in part on the strain force on the tip measured by the strain sensor.

12. The apparatus as described in claim 11, wherein the strain force on the tip indicates a direction of movement of the tip relative to an adjacent surface, and wherein the haptic motor is configured to apply the haptic force to the tip based on the direction of movement of the tip.

13. The apparatus as described in claim 11, further comprising control logic stored in memory and configured to determine a strain force on the tip based on one or more strain measurements received from the strain sensor, and to control a haptic mode of the haptic motor based on the strain force on the tip.

14. The apparatus as described in claim 11, further comprising:
a haptic circuit including multiple haptic elements that are each attached to a different individual spoke of the multiple spokes and that form at least a portion of the haptic motor, each haptic element being positioned to generate haptic force on a respective spoke.

15. A computer-implemented method, comprising:
determining an overall strain measurement for a handheld input apparatus using strain force measurements received from strain sensor elements each attached to different respective spokes of a spoke plate of the handheld input apparatus;
determining a direction of movement of a handheld input apparatus relative to an input surface based at least in part on the overall strain measurement;
determining a haptic mode to be applied to the handheld input apparatus based at least in part on the direction of movement of the handheld input apparatus; and
applying the haptic mode to the handheld input apparatus to cause a haptic interaction between a tip of the handheld input apparatus and the input surface.

16. A computer-implemented method as recited in claim 15, wherein the direction of movement is determined by comparing the strain force measurements.

17. A computer-implemented method as recited in claim 15, wherein the haptic mode identifies a plane in which the tip is to vibrate.

18. A computer-implemented method as recited in claim 15, wherein the haptic mode identifies rotational movement of the tip.

19. A computer-implemented method as recited in claim 15, wherein the overall strain measurement represents one or more of a radial load or an axial load on the tip of the handheld input apparatus.

20. A computer-implemented method as recited in claim 15, further comprising temporarily deactivating a haptic motor of the handheld input apparatus while the strain force measurements are collected.

* * * * *